(12) United States Patent
Tanabe et al.

(10) Patent No.: US 11,838,092 B2
(45) Date of Patent: Dec. 5, 2023

(54) WIRELESS COMMUNICATION APPARATUS AND METHOD

(71) Applicant: NEC Corporation, Tokyo (JP)

(72) Inventors: Kosuke Tanabe, Tokyo (JP); Nader Zein, Heidelberg (DE); Jun Qian, London (GB); Christos Masouros, London (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/891,290

(22) Filed: Aug. 19, 2022

(65) Prior Publication Data

US 2023/0074879 A1 Mar. 9, 2023

(30) Foreign Application Priority Data

Sep. 8, 2021 (JP) .................................. 2021-146426

(51) Int. Cl.
*H04B 7/08* (2006.01)
*H04B 7/06* (2006.01)

(52) U.S. Cl.
CPC ........... *H04B 7/086* (2013.01); *H04B 7/0617* (2013.01)

(58) Field of Classification Search
CPC .... H04B 7/086; H04B 7/0617; H04B 7/0874; H04B 7/088
USPC ........................................................ 375/267
See application file for complete search history.

(56) References Cited

U.S. PATENT DOCUMENTS

2017/0195834 A1* 7/2017 Na ..................... G01S 5/0249
2019/0372399 A1* 12/2019 Park ..................... H01Q 3/30

OTHER PUBLICATIONS

Zhenyu Xiao et al., "Hierarchical Codebook Design for Beamforming Training in Millimeter-Wave Communication", IEEE Transactions on Wireless Communications, vol. 15, No. 5, May 2016.

* cited by examiner

*Primary Examiner* — Fitwi Y Hailegiorgis
(74) *Attorney, Agent, or Firm* — Sughrue Mion, PLLC

(57) ABSTRACT

A wireless communication apparatus performs a first processing for changing the receiving beam in a first direction to determine a first angle for the receiving beam. The wireless communication apparatus performs a second processing for changing the receiving beam in the first direction from the first angle to determine a second angle that is a final angle for the receiving beam.

13 Claims, 32 Drawing Sheets

Fig. 13

|  | FIRST SEARCHING PROCESSING | SECOND SEARCHING PROCESSING |
|---|---|---|
| NUMBER OF ANTENNA ELEMENTS | $2 <= n1 < N$ | $N1 < n2 <= N$ |
| INTERVAL BETWEEN ADJACENT SEARCH POINTS | $In1 = a1 \cdot HPBW1$ | $In2 = a2 * HPBW2$ |
| SEARCH RANGE | FIRST SEARCH RANGE Rs1 | SECOND SEARCH RANGE Rs2 (INCLUDING p1j AND SMALLER THAN Rs1) |
| HPBW1 > HPBW2<br>a1 >= a2<br>In1 > In2 | | |

Fig. 23

| | | ANTENNA ARRANGEMENT | INTERVAL BETWEEN SEARCH POINTS | NUMBER OF SEARCH POINTS |
|---|---|---|---|---|
| FIRST PROCESSING | FIRST SEARCHING PROCESSING | 4×4 | In1= 10[deg] HPBW2=17[deg] a2=0.59 | 36=6×6 |
| | SECOND SEARCHING PROCESSING | 8×8 | In2= 5[deg] HPBW2=8.4[deg] a2=0.59 | 4=2×2 |
| SECOND PROCESSING | | 8×8 | | 10 |
| | | | SUM OF SEARCH POINTS | 50 |

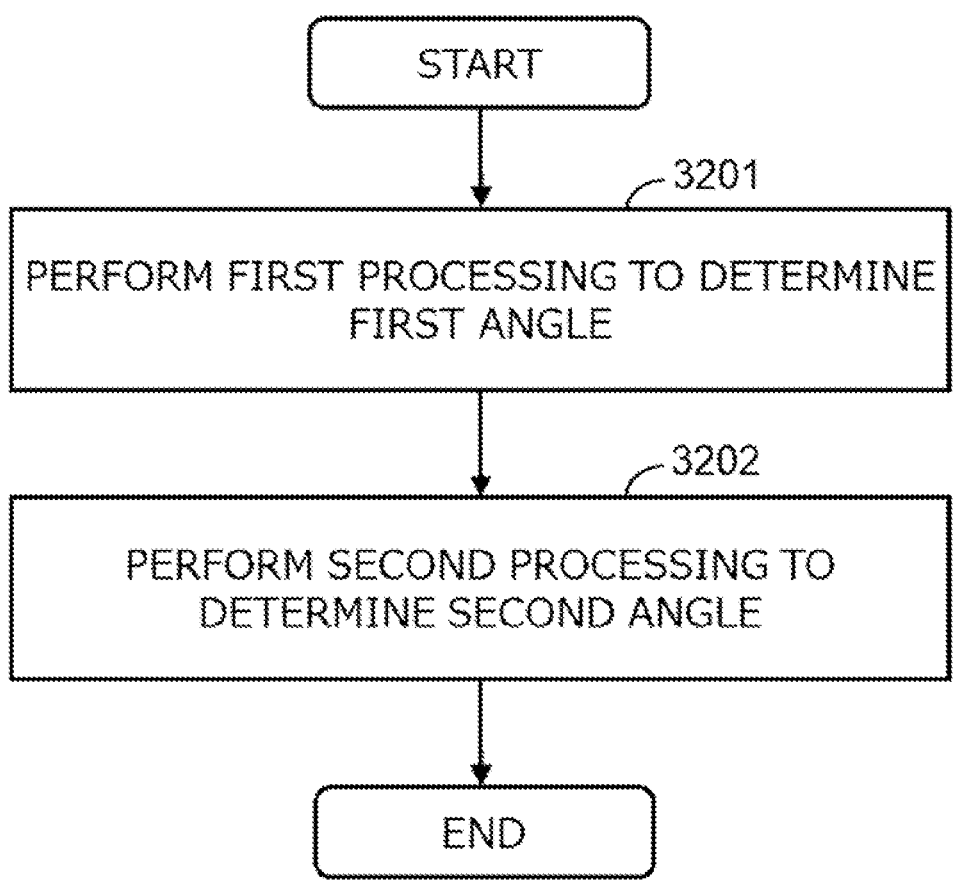

WIRELESS COMMUNICATION APPARATUS AND METHOD

CROSS-REFERENCES TO RELATED APPLICATION

The present application claims priority to Japanese patent application No. JP 2021-146426 filed on Sep. 8, 2021, the content of which is hereby incorporated by reference in its entirety.

BACKGROUND

Technical Field

The present disclosure relates to a wireless communication apparatus and a method performed by the wireless communication apparatus.

Background Art

In the field of wireless communication, a technique have been proposed for estimating an arrival direction for a radio wave. This technique is applied to controlling of beam formed by an antenna of one wireless communication apparatus (e.g. a base station) directed to another wireless communication apparatus (e.g. another base station) for example.

NPL 1 proposed a technique for searching an optimal beam direction using a hierarchical codebook.

[NPL 1] Zhenyu Xiao et al., "Hierarchical Codebook Design for Beamforming Training in Millimeter-Wave Communication", IEEE TRANSACTIONS ON WIRELESS COMMUNICATIONS, VOL. 15, NO. 5, May 2016.

SUMMARY

For example, in one wireless communication system, it is provided that a first wireless communication apparatus communicates wirelessly with a second wireless communication apparatus. In this case, the first wireless communication apparatus estimates a direction in which the second wireless communication apparatus is located (i.e. an arrival angle at which a radio signal is transmitted by the second wireless communication apparatus) in order to direct the beam formed by an antenna in an optimal direction.

In relevant technique, in order to estimate the arrival angle for the radio signal, the following method is performed. Firstly, a large number of search points are set in an angular range in which the radio signal may arrive. Then, among the large number of search points, an angle is searched at which a reception level is largest for the radio signal. Hereinafter such method is referred to as "simple searching method". However, for this simple searching method, the number of search points is increased. Accordingly, it is a problem in that it takes longer time taken for searching processing.

The present disclosure provides a technique for allowing for reducing the time taken for the estimation over the above-mentioned simple searching method.

In one or more example embodiments, there is provided a wireless communication apparatus. The wireless communication apparatus includes: an antenna array including a plurality of antenna elements; a memory configured to store an instruction; and at least one processor configured to execute the instruction to control a receiving beam formed by the antenna array, the receiving beam being for receiving a radio signal transmitted by another wireless communication apparatus. The at least one processor is further configured to execute the instruction to perform a first processing for changing, using the plurality of antenna elements selected in the antenna array, the receiving beam in a first direction to determine a first angle for the receiving beam. The at least one processor is further configured to execute the instruction to perform a second processing for changing, using a number of antenna elements larger than or equal to the number of antenna elements used in the first processing, the receiving beam in the first direction from the first angle to determine a second angle that is a final angle for the receiving beam.

In one or more example embodiments, there is provided a method performed in a wireless communication apparatus including an antenna array including a plurality of antenna elements. The method includes: controlling a receiving beam formed by the antenna array, the receiving beam is for receiving radio signal transmitted by another wireless communication apparatus; performing a first processing for changing, using the plurality of antenna elements selected in the antenna array, the receiving beam in a first direction to determine a first angle for the receiving beam; and performing a second processing for changing, using a number of antenna elements larger than or equal to the number of antenna elements used in the first processing, the receiving beam in the first direction from the first angle to determine a second angle that is a final angle for the receiving beam.

According to the configuration it can reduce the time taken for the estimation over the simple searching method. Problems, configurations, and effects other than those described above become apparent in the following description of the example embodiments.

BRIEF DESCRIPTION OF THE DRAWINGS

FIG. 13 is a diagram illustrating details of the first searching processing and the second searching processing.

FIG. 23 is a diagram illustrating a specific example of a processing for estimating the arrival angle for the radio signal.

FIG. 32 is a diagram showing an example flow of a processing in the wireless communication apparatus according to the second example embodiment.

DESCRIPTION OF THE EXAMPLE EMBODIMENTS

In the following, one or more example embodiments will be described with reference to the accompanying drawings. Note that, in the Specification and drawings, elements to which similar descriptions are applicable are denoted by the same reference signs, and overlapping descriptions are hence omitted.

Descriptions will be given in the following order.
1. Related Techniques
2. Overview of Example Embodiments
3. First Example Embodiment
3-1. Configuration of Wireless Communication System
3-2. Configuration of First Wireless Communication Apparatus
3-3. Configuration of Second Wireless Communication Apparatus
3-4. Overview of Processing for Estimating Arrival Angle for Radio Signal
3-5. First Processing
3-6. Second Processing
3-7. Flow of Processing in First Wireless Communication Apparatus
3-8. Flow of Processing in Second Wireless Communication Apparatus
3-9. Effect
3-10. Example Alteration
4. Second Example Embodiment
4-1. Configuration Wireless Communication Apparatus
4-2. Flow of Processing

1. RELATED TECHNIQUES

Figure 1:
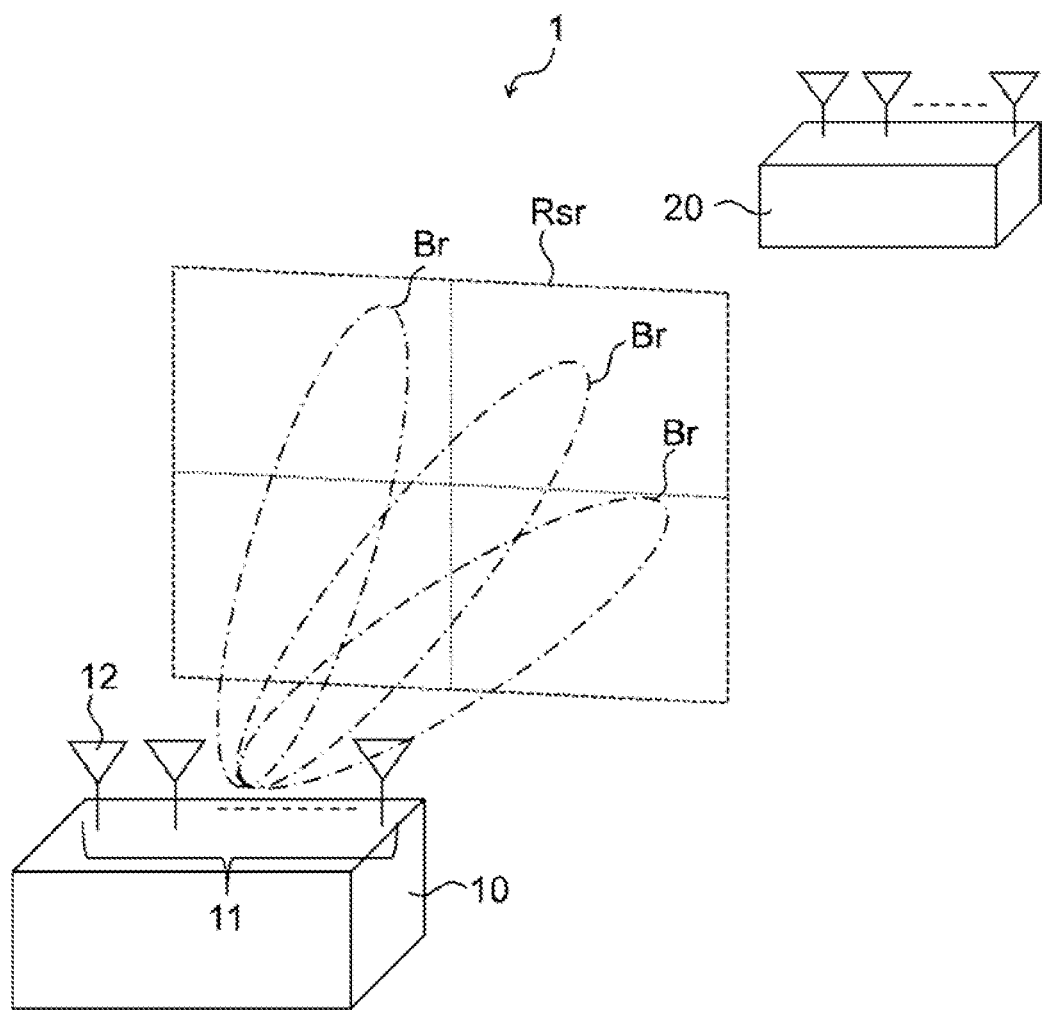
FIG. 1 is a diagram illustrating an example of a wireless communication system.

With reference to FIG. 1, as related techniques of example embodiments as mentioned below, beamforming will be described.

FIG. 1 illustrates one example of a wireless communication system 1. The wireless communication system 1 comprises a first wireless communication apparatus 10 and a second wireless communication apparatus 20 opposite to the first wireless communication apparatus 10. The first wireless communication apparatus 10 and the second wireless communication apparatus 20 communicate wirelessly.

The first wireless communication apparatus 10 comprises an antenna array 11. The antenna array 11 includes a plurality of antenna elements 12. Hereinafter, the combination of radio waves (signals) transmitted or received by the one or more antenna elements 12 is referred to as "beam". More specifically, the beam obtained by combining the signals transmitted by the one or more antenna elements 12 is referred to as "transmitting beam Bt". The beam obtained by combining the signals received by the one or more antenna elements 12 is referred to as "receiving beam Br".

Next, the control of the receiving beam Br will be briefly described in which the radio signal transmitted by the second wireless communication apparatus 20 is received. The first wireless communication apparatus 10 tunes the phase and amplitude for the signal received by each of the antenna elements 12 (hereinafter referred to as "received signal" collectively) to change the angle (direction) for the receiving beam Br. For example, the first wireless communication apparatus 10 applies a weighting factor (value representing the phase and amplitude) to each of the received signals to change the angle for the receiving beam Br. Such control is well-known, and referred to as "directional control".

Figure 2:
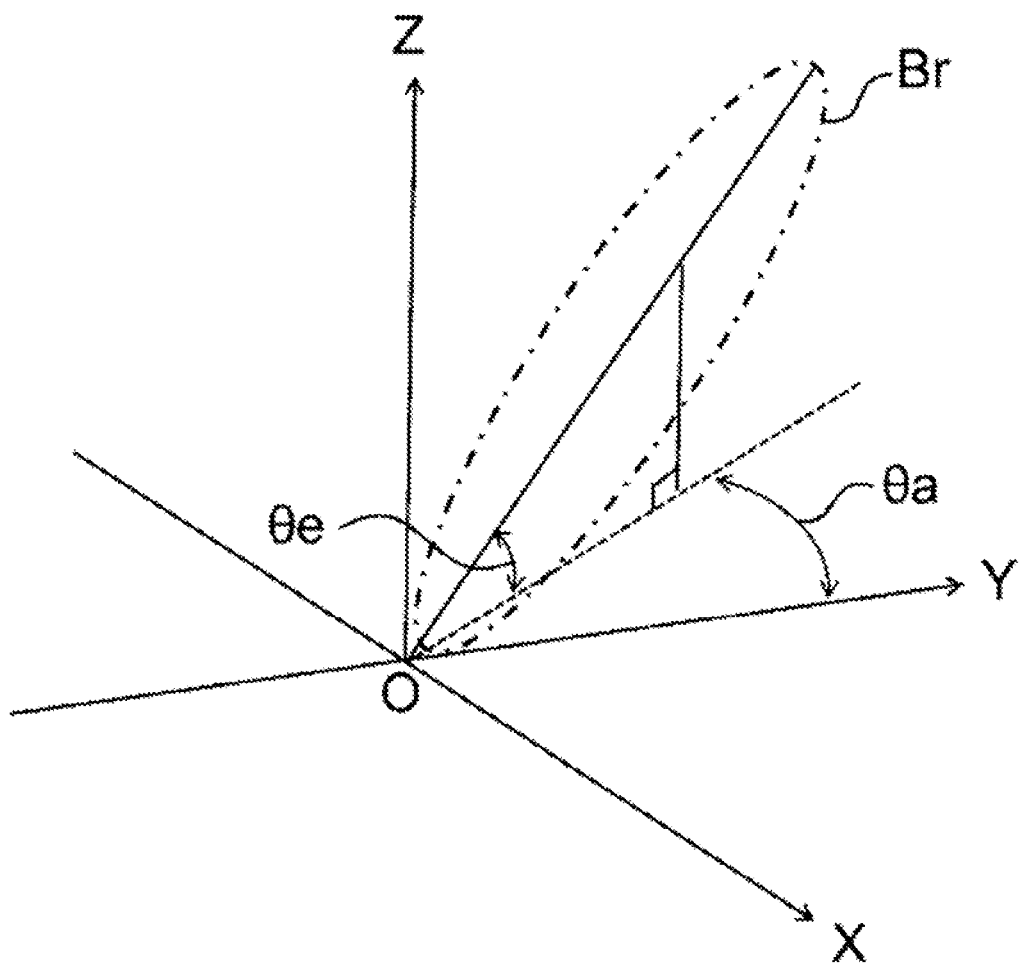
FIG. 2 is a diagram illustrating an azimuth angle and an elevation angle for a receiving beam.

FIG. 2 is a diagram illustrating the definition of angle for the receiving beam Br. The angle for the receiving beam Br is defined by an azimuth angle θa and an elevation angle θe.

The azimuth angle θa is an angle between a reference axis (Y axis in the example) set in a reference plane (XY plane in the example) and a central axis in the receiving beam Br representing directionality. For example, the central axis in the receiving beam Br is in a positive range in X, the azimuth angle θa has a positive value. The central axis in the receiving beam Br is in a negative range in X, the azimuth angle θa has a negative value.

The elevation angle θe is an angle between the reference plane (XY plane) and the central axis in the receiving beam Br. For example, the central axis in the receiving beam Br is in a positive range in Z, the elevation angle θe has a positive value. The central axis in the receiving beam Br is in a negative range in Z, the elevation angle θe has a negative value.

As shown in FIG. 1, the first wireless communication apparatus 10 can change the angle for the receiving beam Br within a predetermined range Rsr. For example, the range Rsr is defined by two-dimensional plane of the azimuth angle θa and the elevation angle θe. Hereinafter, the above-mentioned range is referred to as "steering range Rsr for the receiving beam Br".

2. OVERVIEW OF EXAMPLE EMBODIMENTS

An overview of one or more example embodiments as mentioned below will be described.

(1) Technical Issues

It is provided that the first wireless communication apparatus 10 tunes the angle for the receiving beam Br such that the reception level of the radio signal transmitted by the second wireless communication apparatus 20 is largest in the wireless communication between the first wireless communication apparatus 10 and the second wireless communication apparatus 20. In this case, it is necessary for the first wireless communication apparatus 10 to estimate the arrival angle for the radio signal accurately.

In the above-mentioned simple searching method, the following processing is performed. Firstly, the steering range Rsr for the receiving beam Br is divided into predetermined units (angles), thereby obtaining a large number of combinations of azimuth angle θa and elevation angle θe. The large number of combinations are set as search points. From the large number of search points, a point in which the reception level for the radio signal is largest (i.e. the combinations of azimuth angle θa and elevation angle θe) is searched.

In the simple searching method, it is a problem in that it takes longer time taken for searching processing because the number of search points are large. For this problem, it is considered that the steering range Rsr is divided into larger units in order to reduce the time taken for searching processing. However, in this case, the accuracy in estimating the arrival angle for the radio signal is reduced because the interval between the search points is increased.

Therefore, there is a need for a technique for estimating the arrival angle for the radio signal accurately, and reducing the time taken for estimation comparing to the simple searching method.

(2) Technical Features

In one or more example embodiments, a wireless communication apparatus is provided. The wireless communication apparatus comprises an antenna array and a controller. The antenna array includes a plurality of antenna elements. The controller controls a receiving beam formed by the antenna array, the receiving beam being for receiving a radio signal transmitted by another wireless communication apparatus.

The controller performs a first processing. The first processing is for changing, using the plurality of antenna elements selected in the antenna array, an azimuth angle and an elevation angle for the receiving beam to determine a first angle. The first angle is a combination of the azimuth angle and the elevation angle for the receiving beam.

Further, the controller performs a second processing. The second processing is for changing, using a number of antenna elements larger than or equal to the number of antenna elements used in the first processing, the azimuth angle and the elevation angle separately from the first angle to determine s second angle. The second angle is a final combination of the azimuth angle and the elevation angle.

According to the above configuration, the wireless communication apparatus can estimate the arrival angle for the radio signal as the second angle by performing the first processing and the second processing in stages. The wireless communication apparatus can estimate the arrival angle for the radio signal accurately, and reduce the time taken for estimation comparing to the above-mentioned simple searching method.

3. FIRST EXAMPLE EMBODIMENT

Then, with reference to FIG. 3 to FIG. 30, a first example embodiment and its example alterations will be described.

<3-1. Configuration of Wireless Communication System>

Figure 3:
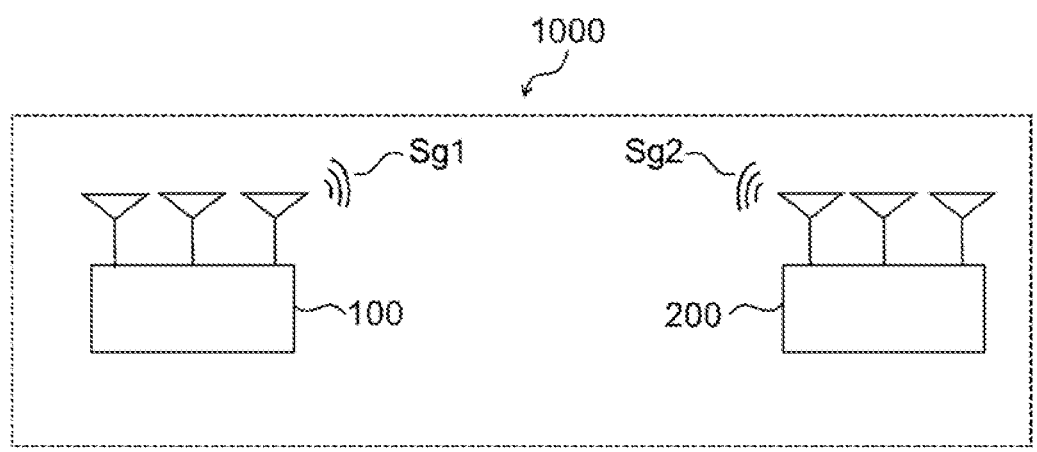
FIG. 3 is a diagram showing an example configuration of a wireless communication system according to a first example embodiment.

FIG. 3 is a diagram showing an example configuration of a wireless communication system 1000. For example, the wireless communication system 1000 may be a fixed microwave/millimeter wave wireless communication system or Fixed Wireless Access (FWA) system, but not limited to this example.

The wireless communication system 1000 includes a first wireless communication apparatus 100 and a second wireless communication apparatus 200.

Each of the first wireless communication apparatus 100 and the second wireless communication apparatus 200 is a fixed wireless base station (fixed station). The first wireless communication apparatus 100 and the second wireless communication apparatus 200 face each other. The first wireless communication apparatus 100 and the second wireless communication apparatus 200 are configured to communicate wirelessly between them.

<3-2. Configuration of First Wireless Communication Apparatus>

Figure 4:
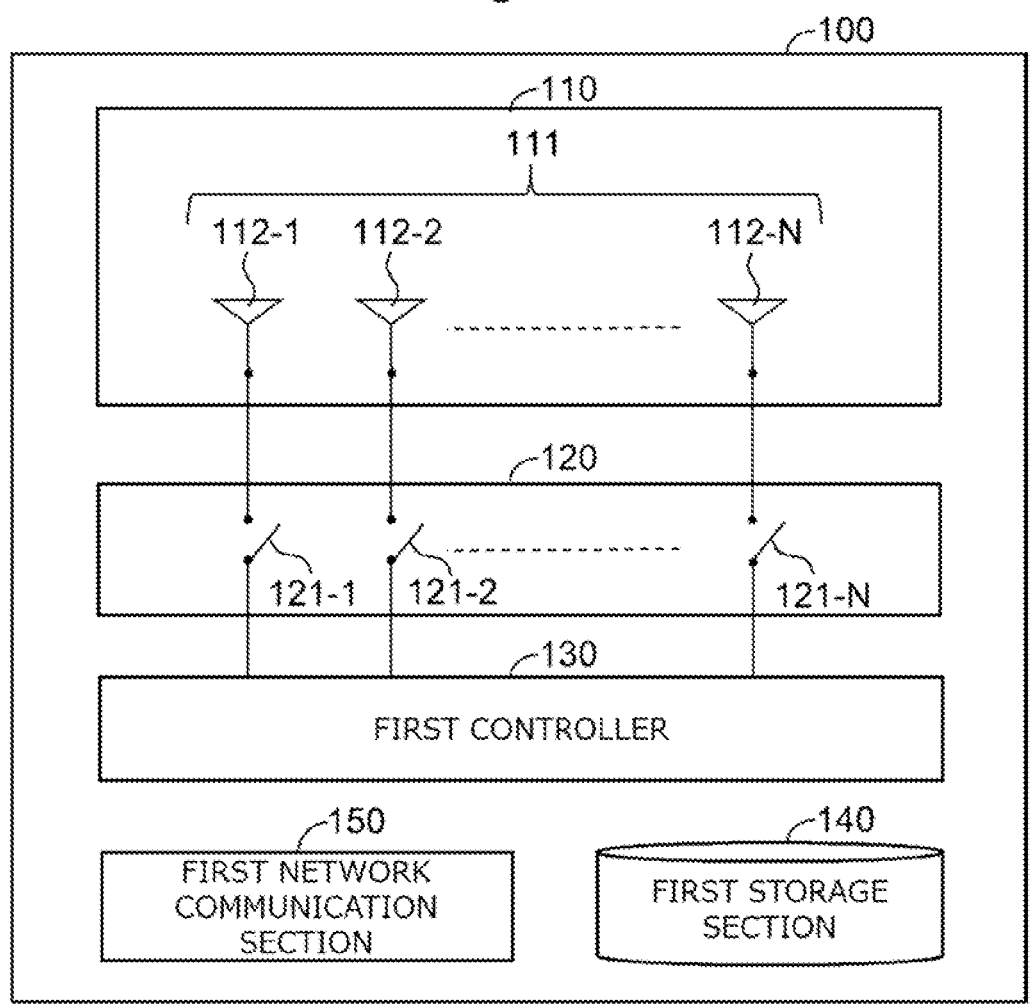
FIG. 4 is a diagram showing an example configuration of a first wireless communication system according to the first example embodiment.

FIG. 4 is a diagram showing an example configuration of the wireless communication system 1000. The first wireless communication apparatus 100 comprises a first wireless communication section 110, a first switch 120, first controller 130, a first storage section 140 and a first network communication section 150.

The first wireless communication section 110 comprises a first antenna array 111. The first antenna array 111 includes a plurality (N) antenna elements 112-1, 112-2, . . . , and 112-N. In the example, N=64. Hereinafter, one or more antenna elements are referenced "112" for the sake of simplicity of description if it is not necessary to distinguish between respective antenna elements.

Figure 5:
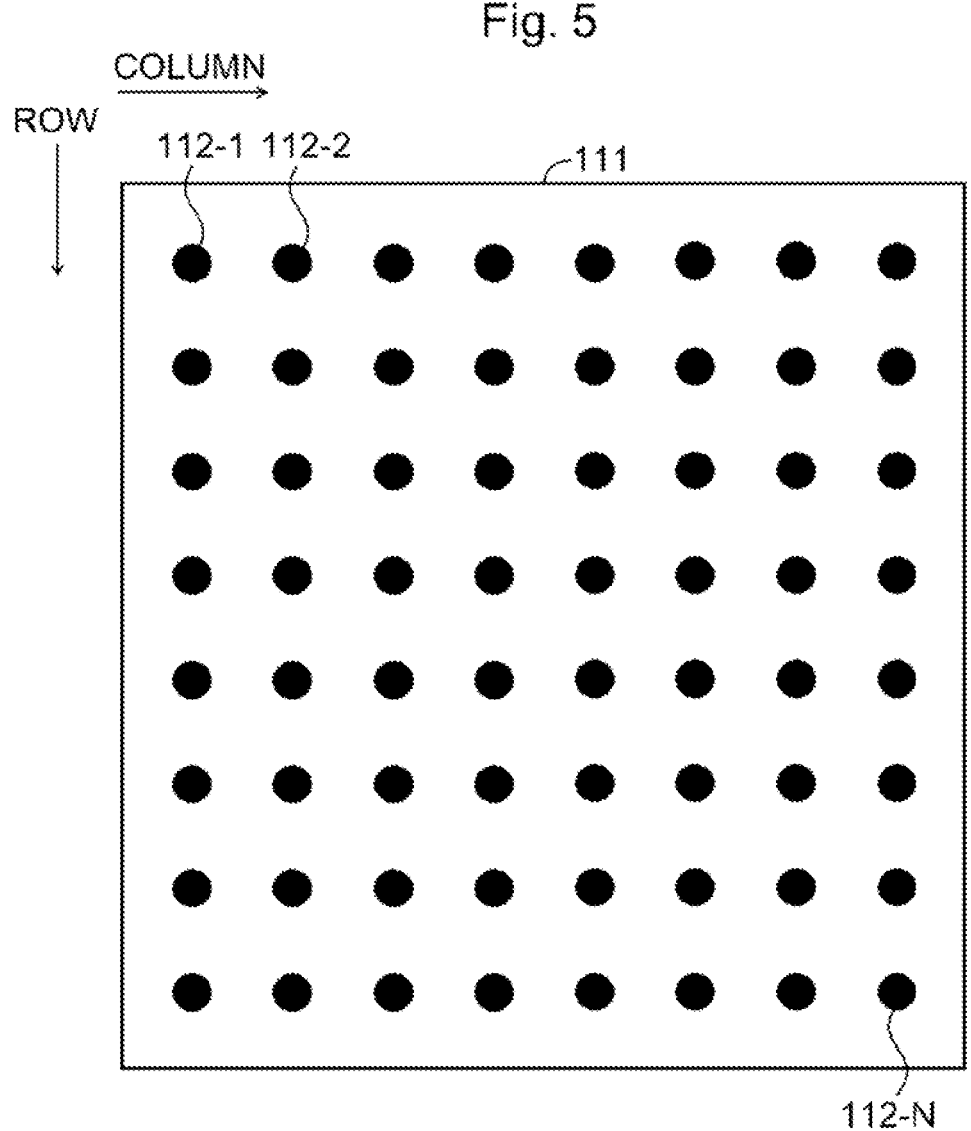
FIG. 5 is a diagram showing an example configuration of a first antenna array according to the first example embodiment.

FIG. 5 is a diagram showing an example configuration of the first antenna array 111. The plurality antenna elements 112-1, 112-2, . . . , and 112-N are arranged in an array with eight rows and eight columns (i.e. 8×8 array).

Returning to the description of FIG. 4, the first switch 120 includes a plurality of switch elements 121-1, 121-2, . . . , and 121-N. Each of the plurality of switch elements 121-1, 121-2, . . . , and 121-N corresponds to each of the plurality of antenna elements 112-1, 112-2, . . . , and 112-N. Hereinafter, one or more switch elements are referenced "121" if it is not necessary to distinguish between respective switch elements.

The first controller 130 includes one or more processors. The one or more processors may include one or more of a central processing unit (CPU), a micro processing unit (MPU) and a micro-controller.

The first storage section 140 includes a volatile memory and a non-volatile memory. The volatile memory may include, for example, a random access memory (RAM). The non-volatile memory may include one or more of a read only memory (ROM), a hard disk drive (HDD) and a solid state drive (SSD). The non-volatile memory stores a program code (instructions) for implementing various functions of the first wireless communication apparatus 100 as mentioned below. The first controller 130 implements the function of the first wireless communication apparatus 100 by performing the program code.

The first network communication section 150 transmits and receives a signal to/from a network (not shown).

Next, an operation will be described in which the first wireless communication apparatus 100 receives radio signal Sg2 (see FIG. 3) transmitted by the second wireless communication apparatus 200. The first controller 130 controls each of the plurality of switch elements 121 independently. That is, the first controller 130 can set each of the plurality of switch elements 121 to an On state or an OFF state.

The first controller 130 controls each of the plurality of switch elements 121 to select one or more antenna elements 112 for receiving the radio signal Sg2. The first controller 130 applies a weighting factor to each of the received signals in the selected antenna elements 112 to form the receiving beam Br.

The same is applicable to an operation in which the first wireless communication apparatus 100 transmits the radio signal Sg1 (see FIG. 3) to the second wireless communication apparatus 200. The first controller 130 controls each of the plurality of switch elements 121 to select one or more antenna elements 112 for transmitting the radio signal Sg1. The first controller 130 applies the weighting factor to signals output to each of the selected antenna elements 112 to form the transmitting beam Bt.

<3-3. Configuration of Second Wireless Communication Apparatus>

Figure 6:
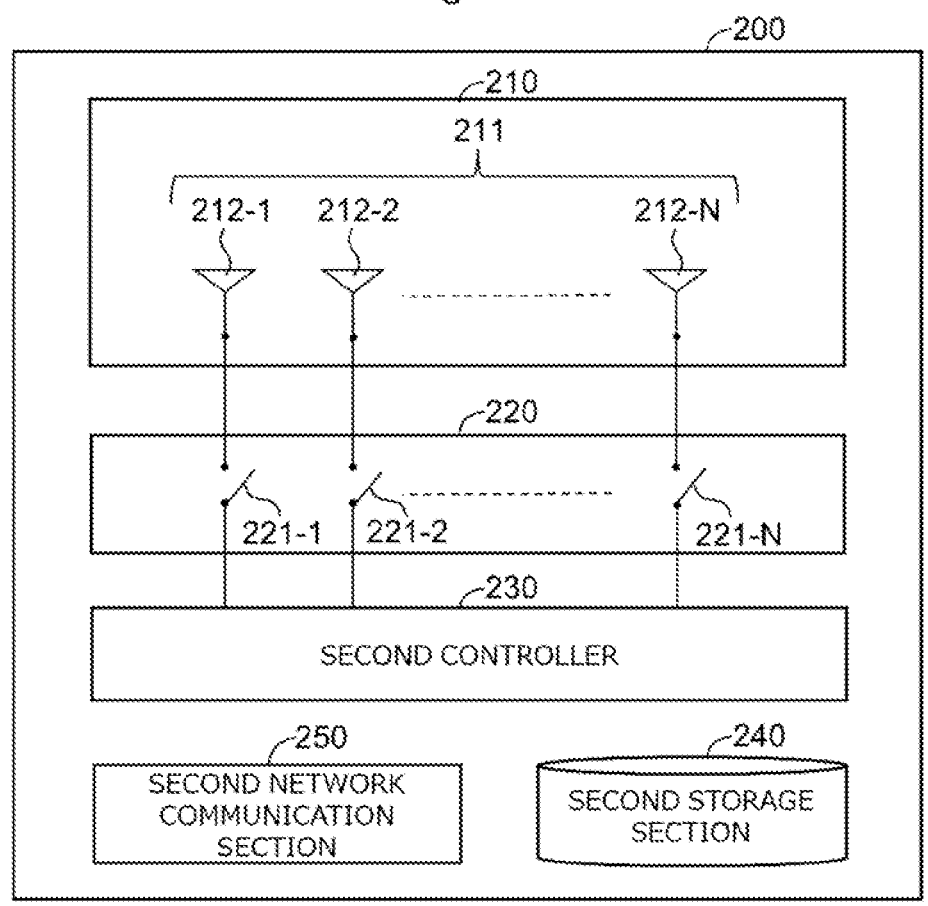
FIG. 6 is a diagram showing an example configuration of a second wireless communication apparatus according to the first example embodiment.

FIG. 6 is a diagram showing an example configuration of the second wireless communication apparatus 200. The second wireless communication apparatus 200 comprises the same components as those in the first wireless communication apparatus 100, so each of components will be described briefly. The second wireless communication apparatus 200 comprises a second wireless communication section 210, a second switch 220, a second controller 230, a second storage section 240 and a second network communication section 250.

The second wireless communication section 210 has the same configuration as that in the first wireless communication section 110. That is, the second wireless communication section 210 comprises a second antenna array 211. The second antenna array 211 includes a plurality of antenna elements 212-1, 212-2, . . . , and, 212-N. Hereinafter, one or more antenna elements are referenced "212" if it is not necessary to distinguish between respective antenna elements.

Although in the example, the second wireless communication section 210 has the same configuration as that in the first wireless communication section 110 for the sake of simplicity of description, it is not limited. It may be different between the number and arrangement of the plurality of antenna elements 112 included in the first wireless communication section 110 and the number and arrangement of the plurality of antenna elements 212 included in the second wireless communication section 210.

The second switch 220 has the same configuration as that in the first switch 120. That is, the second switch 220 includes a plurality of switch elements 221-1, 221-2, . . . , and, 221-N.

The second controller 230 may be configured in the same hardware as that in the first controller 130. Further, the second controller 230 operates in the same fashion as the first controller 130. For example, the second controller 230 selects one or more antenna elements 212 for receiving the radio signal Sg1. The second controller 230 applies the weighting factor to each of the received signals in the selected antenna elements 112 to form the receiving beam Br. Further, the second controller 230 selects one or more antenna elements 212 for transmitting the radio signals Sg2. The second controller 230 applies the weighting factor to output to each of the selected antenna elements 212 to form the transmitting beam Bt.

The second storage section 240 may be configured in the same hardware as that in the first storage section 140. The second storage section 240 stores a program code (instructions) for implementing various functions of the second wireless communication apparatus 200.

The second network communication section 250 may have the same configuration as that in the first network communication section 150.

<3-4. Overview of Processing for Estimating Arrival Angle for Radio Signal>

It is provided that the first wireless communication apparatus 100 have not already determined the direction in which the second wireless communication apparatus 200 is located (that is, the arrival angle is not known at which the radio signals Sg2 is transmitted by the second wireless communication apparatus 200). In this situation, an operation will be described in which the first wireless communication apparatus 100 estimates the arrival angle for the radio signals Sg2.

Firstly, the second wireless communication apparatus 200 transmits the radio signals Sg2 at the fixed angle for the transmitting beam Bt. In this situation, the first controller 130 performs a coarse estimation processing on the arrival angle for the radio signals Sg2. Hereinafter, this estimation processing is referred to as a "first processing".

More specifically, the first controller 130 selects the plurality of antenna elements 112 in the first antenna array 111. The first controller 130 changes, using the selected antenna elements 112, the azimuth angle θa and the elevation angle θe for the receiving beam Br to determine the first angle for the receiving beam Br. The first angle is a combination of the azimuth angle θa and the elevation angle θe for the receiving beam Br. It can be considered that the first angle corresponds to the coarse estimated value of the arrival angle for the radio signals Sg2.

Next, the first controller 130 performs a fine estimation processing on the arrival angle for the radio signals Sg2. Hereinafter, this estimation processing is referred to as a "second processing".

More specifically, the first controller 130 selects a number of antenna elements 112 larger than or equal to the number of antenna elements 112 used in the first processing. The first controller 130 changes, using the selected antenna elements 112, the azimuth angle θa and the elevation angle θe separately from the first angle to determine the second angle. The second angle is a final combination of the azimuth angle θa and the elevation angle θe. The first controller 130 determines the second angle as the arrival angle for the signals Sg2.

In this way, the first controller 130 performs the first processing and the second processing in stages. The first processing takes less time taken to process due to the coarse estimation processing. The second processing is for modifying each of the azimuth angle θa and the elevation angle θe for the receiving beam Br gradually starting from the first angle. The second processing can determine the second angle (i.e. the arrival angle for the radio signal Sg2) accurately. Additionally, the second processing can reduce the time taken to process due to using the outcome from the first processing (i.e. the first angle).

<3-5. First Processing>

Next, details of the first processing will be described. The first processing includes a first searching processing and the second searching processing. The first controller 130 performs the first searching processing and the second searching processing in stages to determine the first angle.

(First Searching Processing)

Figure 7:
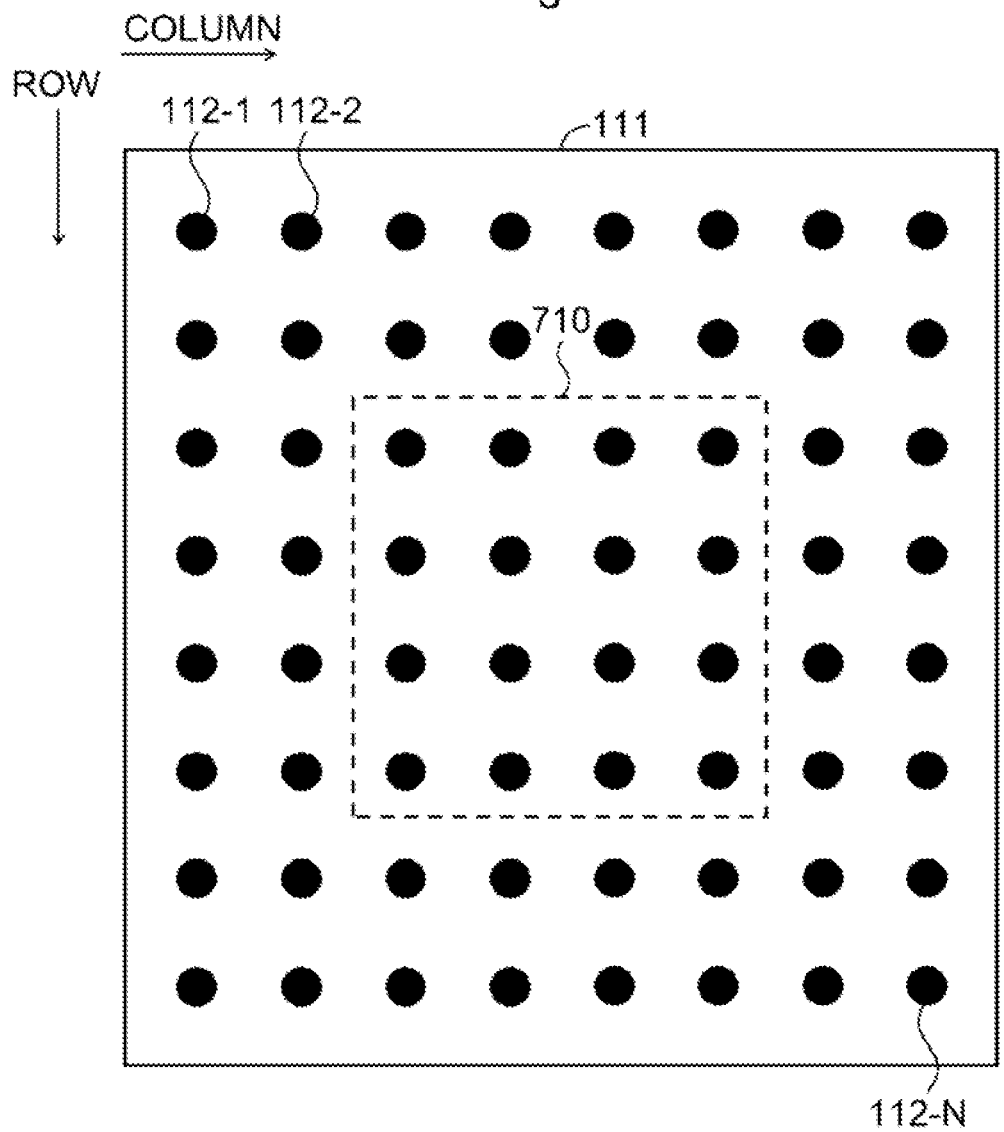
FIG. 7 is a diagram showing antenna elements selected in a first searching processing.

FIG. 7 is a diagram showing the antenna elements 112 selected in the first searching processing. The first controller 130 selects the first number n1 (>=2) in the first antenna array 111. Hereinafter, the arrangement of the antenna elements 112 selected in the first searching processing is referred to as "first antenna arrangement 710". In the example, the first number n1 and the first antenna arrangement 710 are set such that the receiving beam Br can be steered in a direction of the azimuth angle θa and in a direction of the elevation angle θe. More specifically, n1=16. The first antenna arrangement 710 is an array with four rows and four columns (i.e. 4×4 array) at the center of the first antenna array 111.

Figure 8:
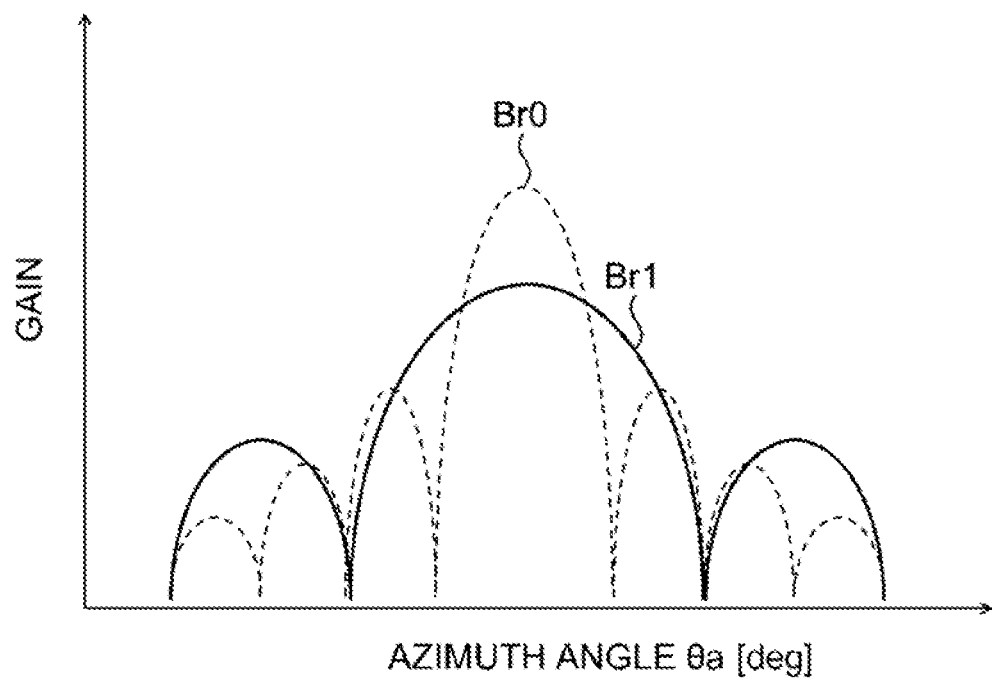
FIG. 8 is a diagram showing the receiving beam viewed in a direction of the azimuth angle.

FIG. 8 is a diagram showing the receiving beam Br viewed in a direction of the azimuth angle θa. The receiving beam Br0 represents a receiving beam formed when using all of the plurality of antenna elements 112. The receiving beam Br1 represents a receiving beam formed when using the first antenna arrangement 710. Each of the receiving beam Br0 and the receiving beam Br1 includes a main lobe (primary beam) and a side lobe (secondary beam).

The gain of the receiving beam Br1 is reduced relative to the gain of the receiving beam Br0 since the number of antenna elements 112 used for the receiving beam Br1 is smaller than the number for the receiving beam Br0. On the other hand, the width of main lobe of the receiving beam Br1 is increased. Although the relationship between the receiving beam Br0 and the receiving beam Br1 viewed in a direction of the azimuth angle θa is described, the same is applicable to the case of viewing in a direction of the elevation angle θe. Therefore, the width of main lobe of the receiving beam Br1 is large, so relatively wide range can be searched at a small number of search points as described below. That is, it can reduce the time taken for the first searching processing.

The first controller 130 sets the first search range Rs1 in the steering range Rsr for the receiving beam Br. The first search range Rs1 is defined by the combination of the azimuth angle θa and the elevation angle θe for the receiving beam Br. That is, the first search range Rs1 is defined by the two-dimensional plane of the azimuth angle θa and the elevation angle θe.

Figure 9:
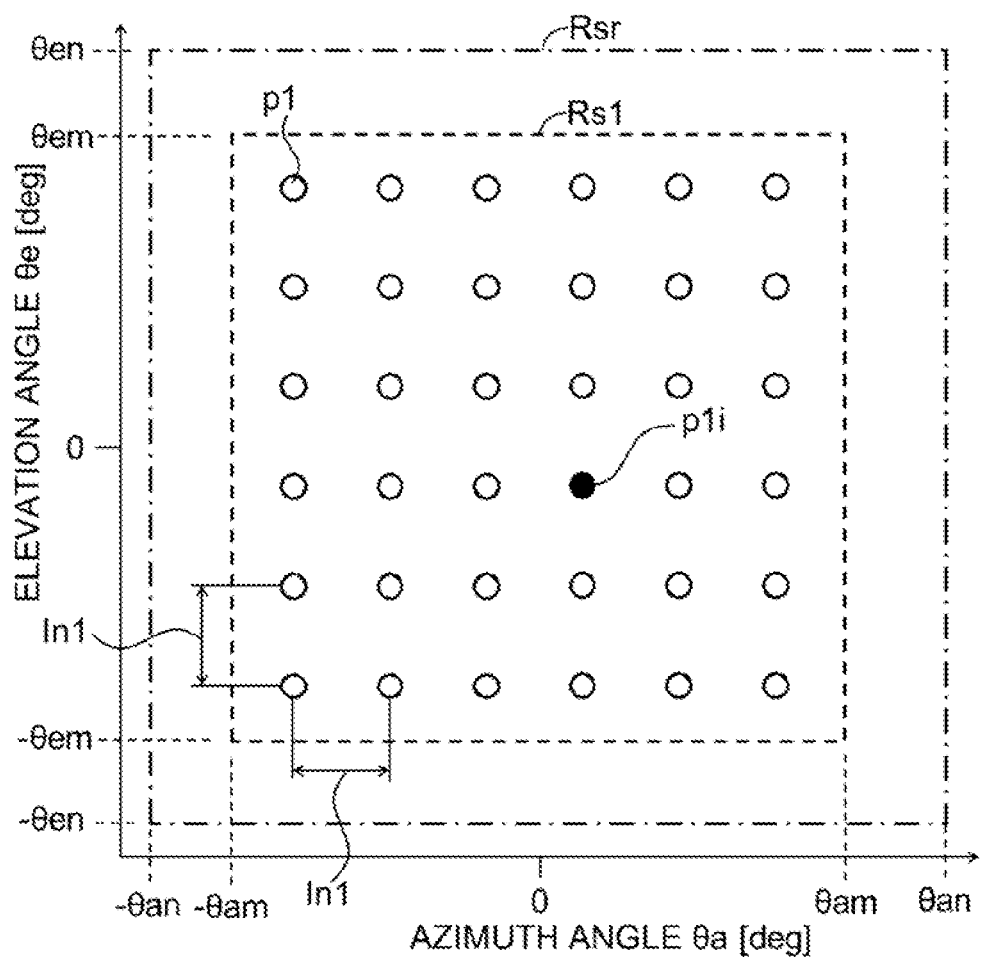
FIG. 9 is a diagram illustrating a steering range and a first search range for the receiving beam.

FIG. 9 is a diagram illustrating the steering range Rsr and the first search range Rs1 for the receiving beam. In the example, the steering range Rsr has a range of −θan to θan for the azimuth angle θa, and a range of −θen to θen for the elevation angle θe.

The first controller 130 sets the range of −θam to θam as the first search range Rs1 for the azimuth angle θa. The first controller 130 sets the range of −θem to θem as the first search range Rs1 for the elevation angle θe. Note that θam<=θan and θem<=θen.

The first search range Rs1 includes a plurality of first search points p1 defined by the combination of the azimuth angle θa and the elevation angle θe. In the example, the first controller 130 sets the plurality of first search points p1 with 6×6 lattice pattern. Therefore, the number of plurality of first search points p1 is 36.

An interval In1 between adjacent two first search points p1 may be set using a half power beam width (HPBW) for the receiving beam Br. Hereinafter, the interval In1 is referred to as "first interval In1". The first interval In1 may be set using equation (1) as below. Wherein HPBW1 is a HPBW for the receiving beam Br in the case of using the first antenna arrangement 710. Wherein a1 is a factor.

$$In1 = a1 * HPBW1 \quad (1)$$

For example, the factor a1 is larger than or equal to 0.1 and smaller than or equal to 1. Preferably, the factor a1 may be larger than or equal to 0.1 and smaller than or equal to 0.6. This is because it is advantageous to perform the searching processing with relatively high gain in the main lobe for the receiving beam Br1 as shown in FIG. 8. Note that if the reduction of gain is permissible, the factor a1 may be set to the value larger than 1.

The first controller 130 changes the azimuth angle θa and the elevation angle θe for the receiving beam Br formed by the first antenna arrangement 710. The first controller 130 then measures the reception level Pr for the radio signals Sg2 at each of the plurality of first search points p1. The reception level Pr is a received signal strength indicator (RSSI) for example. The RSSI represents the magnitude of received power as a basis of 1 mW.

The first controller 130 determines the first point p1i at which the reception level Pr is largest among the plurality of first search points p1. The first point p1i is any one of the plurality of first search points p1, and thus, it is a combination of the azimuth angle θa and the elevation angle θe. Hereinafter, a coordinate of the first point p1i in FIG. 9 is labeled (θai, θei).

(Second Searching Processing)

Figure 10:
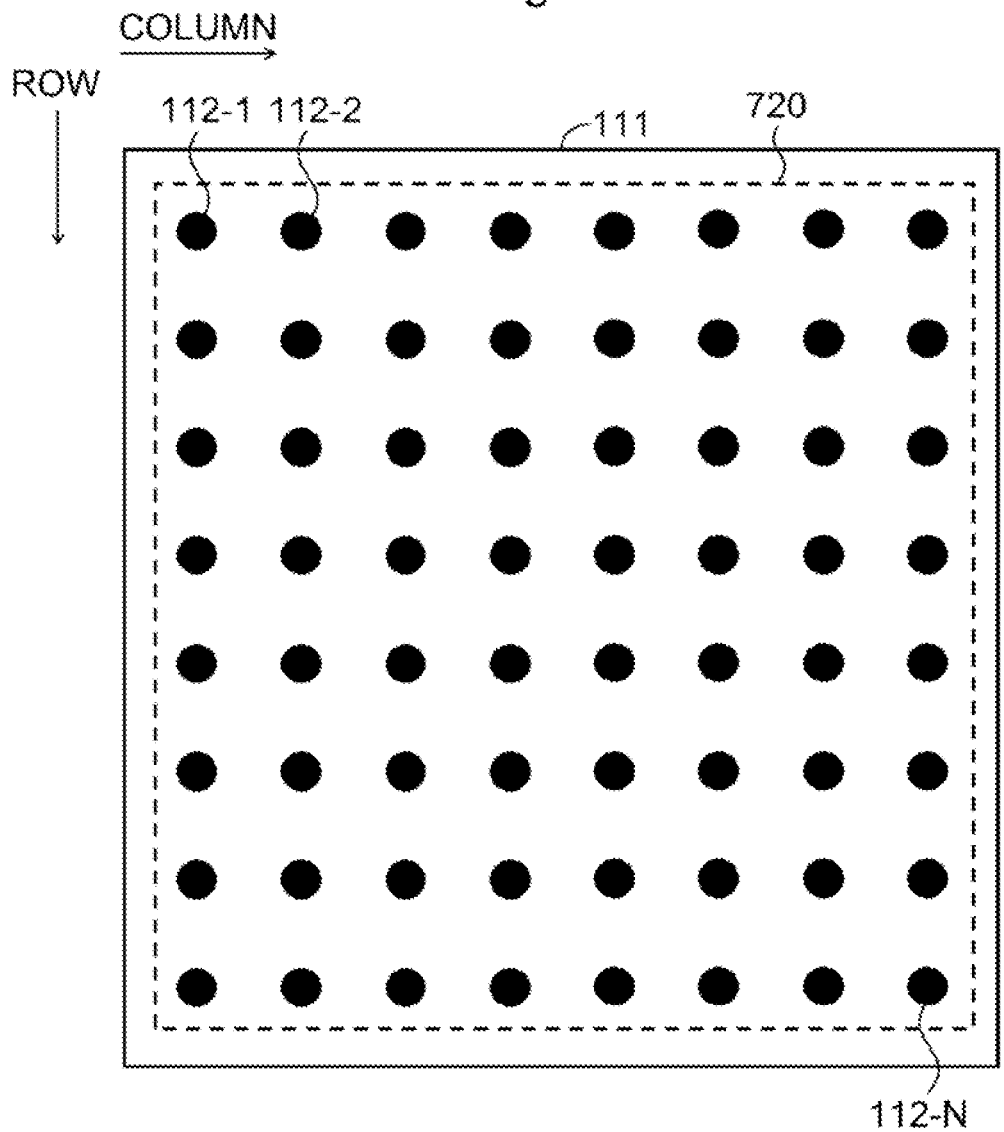
FIG. 10 is a diagram showing antenna elements selected in a second searching processing.

FIG. 10 is a diagram showing the antenna elements 112 selected in the second searching process. The first controller 130 selects the second number n2 of antenna elements 112 in the first antenna array 111. In the example, the first controller 130 selects all of the plurality of antenna elements 112. Therefore, n2=64. The first controller 130 can perform the following processing using the arrangement of the antenna elements 112 with higher gain over the case of the first searching processing. Hereinafter, the arrangement of the antenna elements 112 selected in the second searching processing is referred to as "second antenna arrangement 720".

Note that the second number n2 is not limited to the above example. The second number n2 may have other value larger than the first number n1. Therefore, n1<n2<=N.

Figure 11:
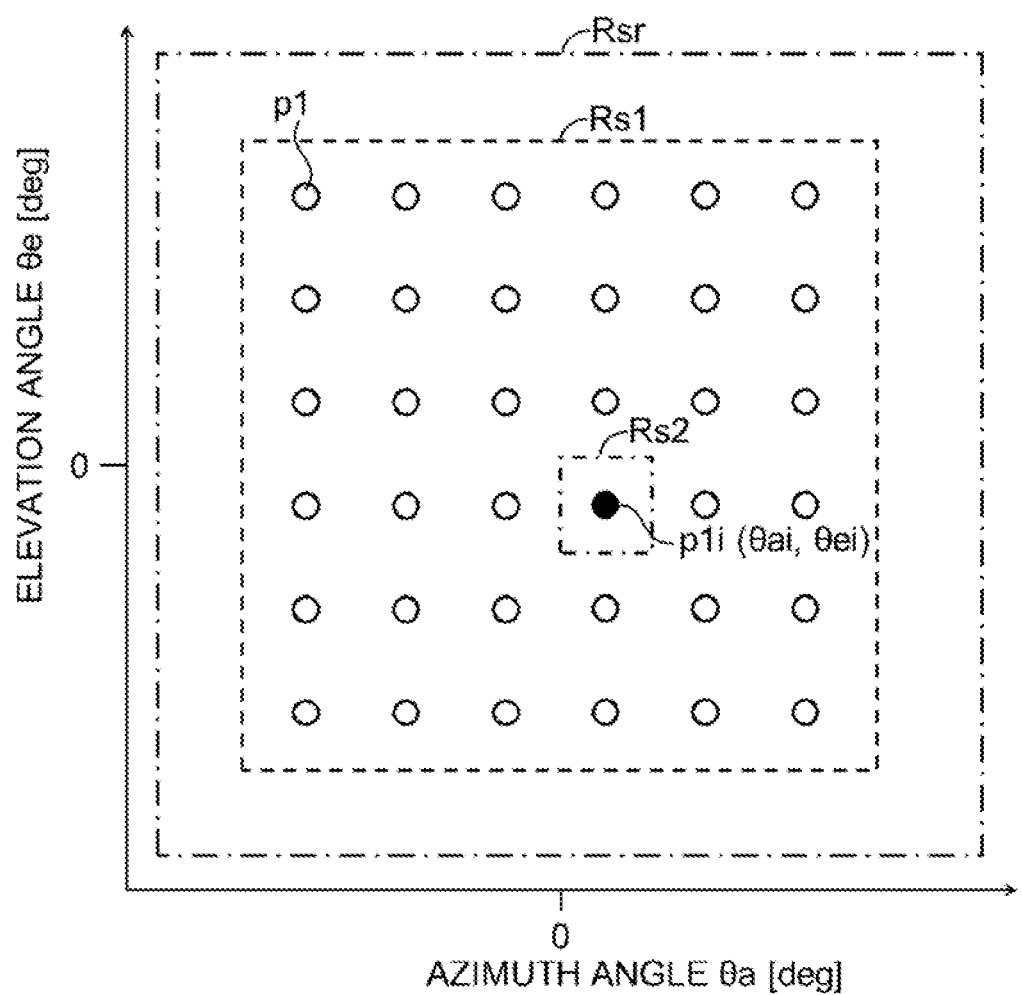
FIG. 11 is a diagram illustrating a second search range.

FIG. 11 is a diagram illustrating the second search range Rs2. The border of the second search range Rs2 is set between the first point p1i and the first search points p1 adjacent to the first point p1i.

The first controller 130 sets the second search range Rs2 using the first point p1i. The second search range Rs2 includes the first point p1i and is smaller than the first search range Rs1.

Figure 12:
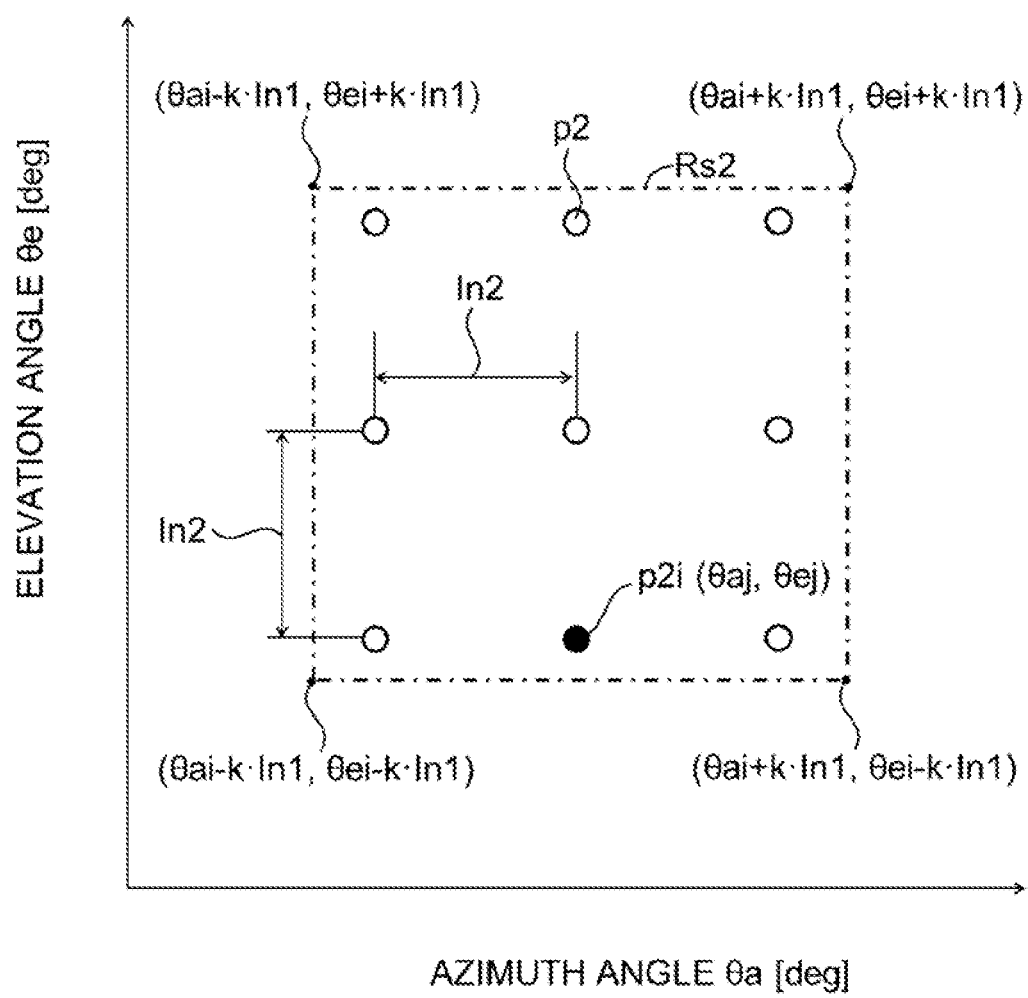
FIG. 12 is a diagram showing an enlarged view of the second search range of FIG. 11.

FIG. 12 is a diagram showing an enlarged view of the second search range Rs2 of FIG. 11. The first controller 130 sets, using the first interval In1, the second search range Rs2 as a basis of the coordinate (θai, θei) of the first point p1i. More specifically, the first controller 130 sets the range from (θai−k*In1) to (θai+k*In1) as the second search range Rs2 for the azimuth angle θa. The first controller 130 sets the range from (θei−k*In1) to (θei+k*In1) as the second search range Rs2 for the elevation angle θe. Wherein k is a factor. For example, k is larger than or equal to 0.5 and smaller than or equal to 1. In the example, the border of the second search range Rs2 is set in-between the first point p1i and the first search points p1 adjacent to the first point p1i. Therefore, k=0.5.

The second search range Rs2 includes a plurality of second search points p2 defined by the combination of the azimuth angle θa and the elevation angle θe. In the example, the first controller 130 sets the plurality of second search points p2 with 3×3 lattice pattern. Therefore, the number of plurality of second search points p2 is 9.

An interval In2 between adjacent two second search points p2 is set using the HPBW. Hereinafter, the interval In2 is referred to as "first interval In2". For example, the second interval In2 may be set using equation (2) as below. Wherein HPBW2 is a HPBW for the receiving beam Br in the case of using the second antenna arrangement 720. a2 is a factor.

$$In2 = a2 * HPBW2 \qquad (2)$$

The factor a2 is smaller than or equal to the factor a1. This is because it is advantageous to perform the searching processing with relatively high gain in the main lobe for the receiving beam Br1 as shown in FIG. 8 similar to the case of the first searching processing.

The first controller 130 changes the azimuth angle θa and the elevation angle θe for the receiving beam Br formed by the second antenna arrangement 720. The first controller 130 then measures the reception level Pr for the radio signals Sg2 at each of the plurality of second search points p2.

The first controller 130 determines the second point p2i at which the reception level Pr is largest among the plurality of second search points p2. The second point p2i is any one of the plurality of second search points p2, and thus, it is the combination of the azimuth angle θa and the elevation angle θe. Hereinafter, a coordinate of the second point p2i in FIG. 12 is labeled (θaj, θej). Then, the first controller 130 determines the second point p2i as the first angle. That is, the first angle is (θaj, θej).

FIG. 13 is a diagram illustrating details of the first searching processing and the second searching processing. The first controller 130 performs the first searching processing using the first antenna arrangement 710. The width of the main lobe for the receiving beam Br formed by the first antenna arrangement 710 is large. The first interval In1 is set according to the HPBW1 for the receiving beam Br. Therefore, the first interval In1 is relatively large. The first controller 130 can search the relatively wide first search range Rs1 at a small number of search points. The accuracy for an estimated value of the arrival angle (in this case, first point p1i) for the radio signals Sg2 may be low because the first searching processing corresponds the coarse search. There may be a considerable error between the actual arrival angle for the radio signals Sg2 and the first point p1i.

The first controller 130 sets the second search range Rs2 using the first point p1i taking the above into consideration. Then the first controller 130 performs the second searching processing using the second antenna arrangement 720 having higher gain than the first antenna arrangement 710. The second search range Rs2 is smaller than the first search range Rs1, and the second interval In2 is smaller than the first interval In1. In this way, the second searching processing corresponds to the fine search using the outcome from the first searching processing. Therefore, the controller 130 can determine the estimated value of the arrival angle (in this case, second point p2i) for the radio signals Sg2 with the less error than the first point p1i. Further, it can reduce the time taken for the second searching processing because the number of plurality of second search points p2 included in the second search range Rs2 is small.

<3-6. Second Processing>

Figure 14:
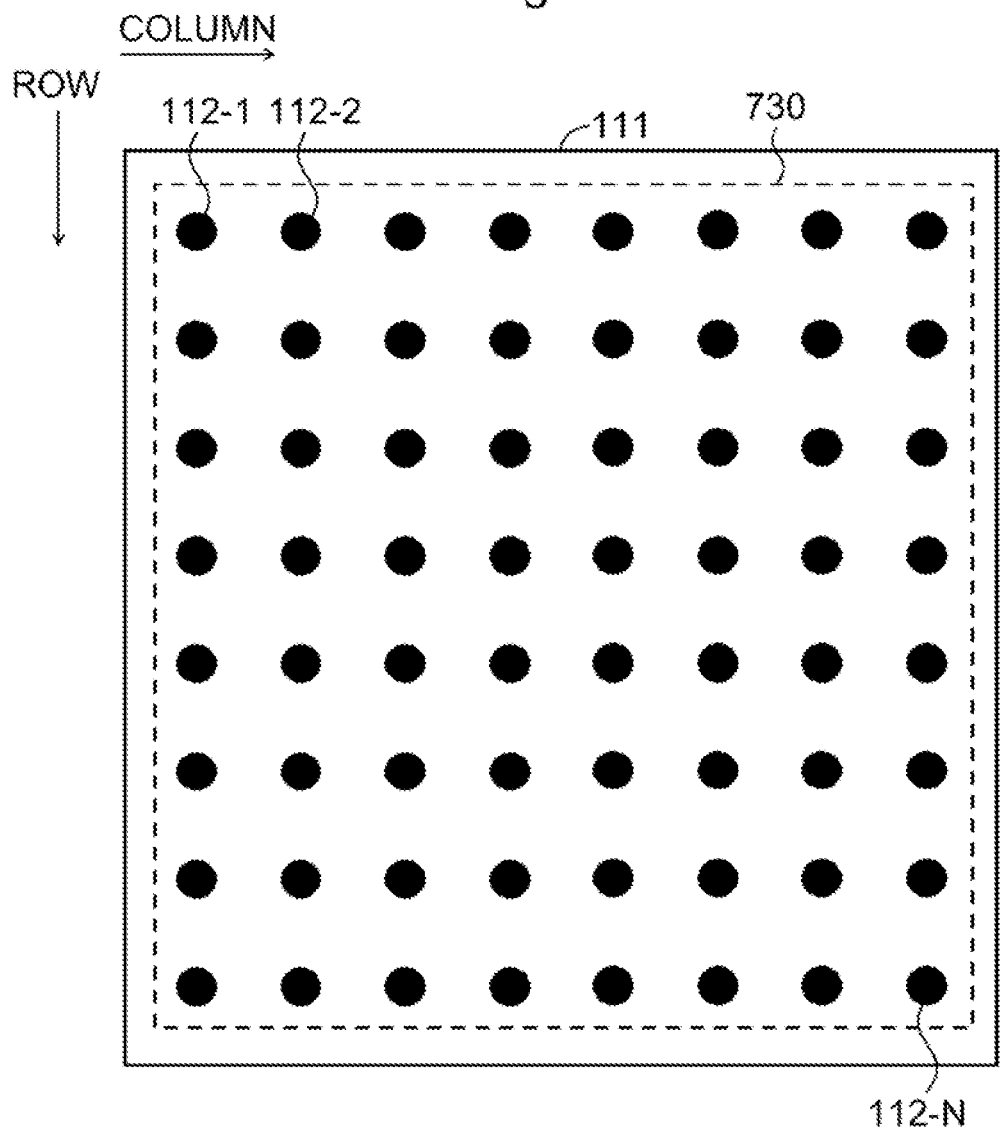
FIG. 14 is a diagram showing antenna elements selected in the second processing.

Next, detail of the second processing will be described. FIG. 14 is a diagram showing the antenna elements 112 selected in the second processing.

The first controller 130 selects the third number n3 of antenna elements 112 in the first antenna array 111. The third number n3 is larger than or equal to the second number n2. In this way, the first controller 130 selects a number of antenna elements 112 larger than or equal to the number (n1, n2) of antenna elements 112 used in the first processing. Preferably, the first controller 130 selects all of the plurality of antenna elements 112. In the example, n3=64. Hereinafter, the arrangement of the antenna elements 112 selected in the second processing is referred to as "third antenna arrangement 730".

The first controller 130 changes, using the first angle as a reference angle, the azimuth angle θa and the elevation angle θe alternately for the receiving beam Br formed by the third antenna arrangement 730 to determine the second angle. The second processing includes a first tuning processing and a second tuning processing.

(First Tuning Processing)

The first tuning processing is for modifying the azimuth angle (θaj in the example) in the first angle using a predetermined first relationship. The first relationship represents a relationship between the error between the actual arrival azimuth angle for the radio signals Sg2 (azimuth angle at which the radio signals Sg2 actually arrives) and the estimated azimuth angle for the radio signals Sg2 (azimuth angle at which the radio signals Sg2 is estimated to arrive) (hereinafter referred to as "first error"), and the gain difference caused due to the first error.

Figure 15:
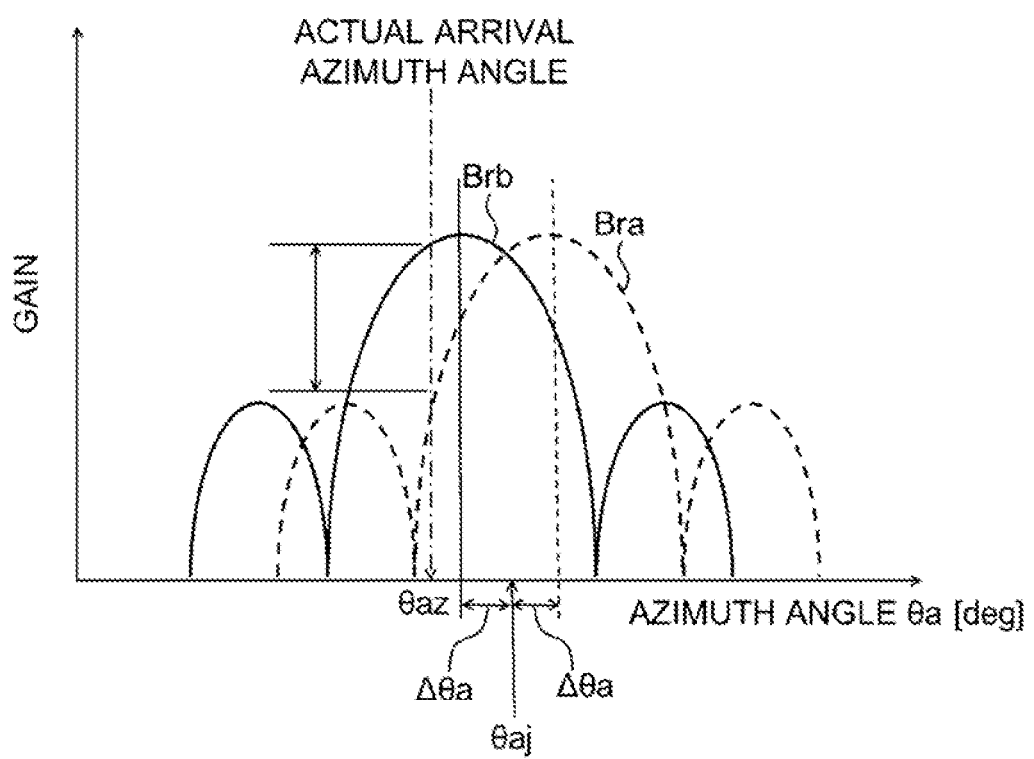
FIG. 15 is a diagram illustrating a first tuning processing.

FIG. 15 is a diagram illustrating the first tuning processing. The first controller 130 sets the azimuth angle (θaj) in the first angle larger by Δθa. The first controller 130 forms the receiving beam Br at the angle (θaj+Δθa, θej), and measures the reception level Pr for the radio signals Sg2. In FIG. 15, "Bra" represents the receiving beam Br formed at the angle (θaj+Δθa, θej).

Then the first controller 130 sets the azimuth angle (θaj) in the first angle smaller by Δθa. The first controller 130 forms the receiving beam Br at the angle (θaj−Δθa, θej), and measures the reception level Pr for the radio signals Sg2. In FIG. 15, "Brb" represents the receiving beam Br formed at the angle (θaj−Δθa, θej).

If the actual arrival azimuth angle (exact azimuth angle) for the radio signals Sg2 and the azimuth angle (θaj) in the first angle match, there is not gain difference between the receiving beam Bra and the receiving beam Brb. Therefore, there is not difference in the reception level Pr between the receiving beam Bra and the receiving beam Brb.

On the other hand, it is provided that the actual arrival azimuth angle for the radio signals Sg2 is θaz. In this case, as shown in FIG. 15, there is a difference in the reception level Pr due to the gain difference between the receiving beam Bra and the receiving beam Brb.

The first controller 130 calculates the first difference Pd1 on the reception level Pr according to equation (3) as below. Wherein "Pra" is the reception level Pr for the receiving beam Bra. Wherein "Prb" is a reception level Pr for the receiving beam Brb.

$$Pd1 = Pra - Prb \qquad (3)$$

In the example of FIG. 15, the actual arrival azimuth angle θaz for the radio signals Sg2 is smaller than θaj−Δθa.

Therefore, the first difference Pd1 has a negative value. It is provided that the first difference Pd1 is Pds (<0).

Figure 16:
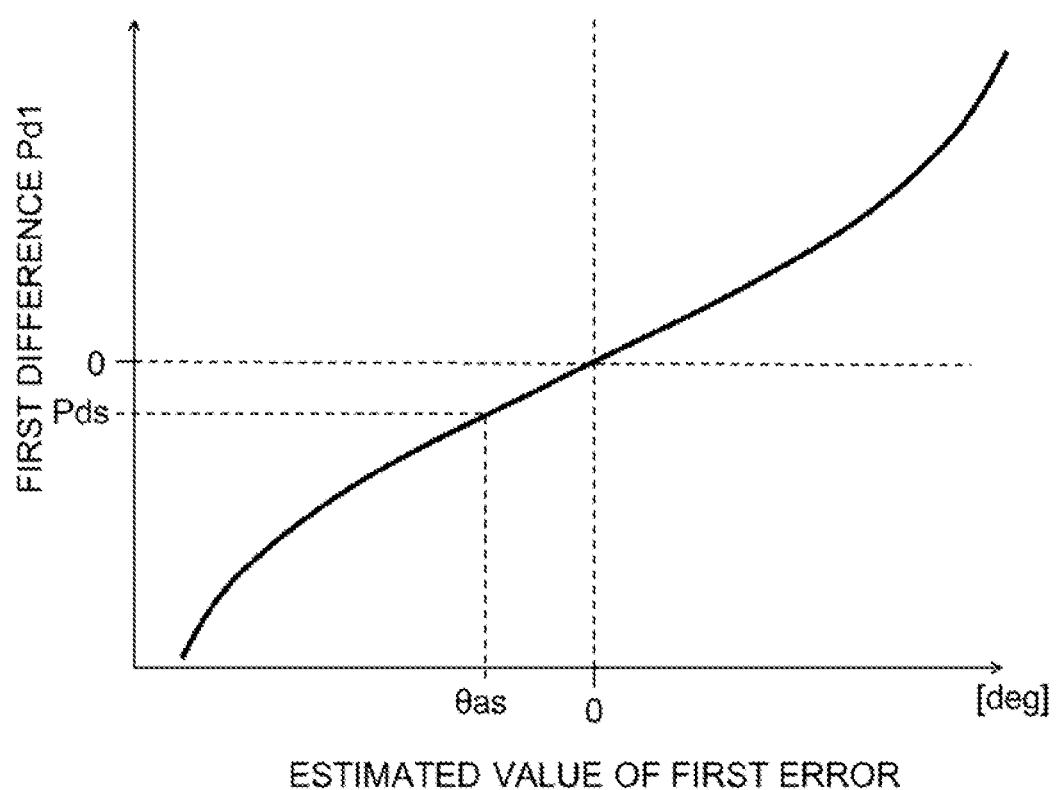
FIG. 16 is a diagram showing an example of a first relationship.

FIG. 16 is a diagram showing an example of a first relationship. The first relationship in the example corresponds to the S curve representing the relationship between the first difference Pd1 and the estimated value of the first error. The S curve is pre-calculated based on the characteristics of the antenna elements 112 included in the first antenna array 111. The information (data) about the first relationship is pre-stored in the first storage section 140.

Note that the slope around zero on the S curve shown in FIG. 16 is determined according to the magnitude of Δθa, and Δθa may be set by taking it into consideration. In another example, Δθa may be set smaller than the second interval In2.

The first controller 130 derives the estimated value (=θas) of the first error by applying the first difference Pd1 (=Pds) to the first relationship. Wherein θas has a negative value. The first controller 130 modifies the azimuth angle (θaj) in the first angle by θas. The first controller 130 can modify, using the first relationship, the azimuth angle in the first angle with the width of the azimuth angle smaller than the second interval In2. Hereinafter, the angle for the receiving beam Br modified in this way is referred to as "first modified angle". Therefore, the first modified angle is (θaj+θas, θej).

(Second Tuning Processing)

Next, the first controller 130 performs the second tuning processing. The second tuning processing is for modifying the elevation angle (θej in the example) in the first angle using a predetermined second relationship. The second relationship represents the relationship between the error between the actual arrival elevation angle for the radio signals Sg2 (azimuth angle at which the radio signals Sg2 actually arrives) and the estimated arrival azimuth angle for the radio signals Sg2 (azimuth angle at which the radio signals Sg2 is estimated to arrive) (hereinafter referred to as "second error"), and the gain difference cause due to the second error.

Figure 17:
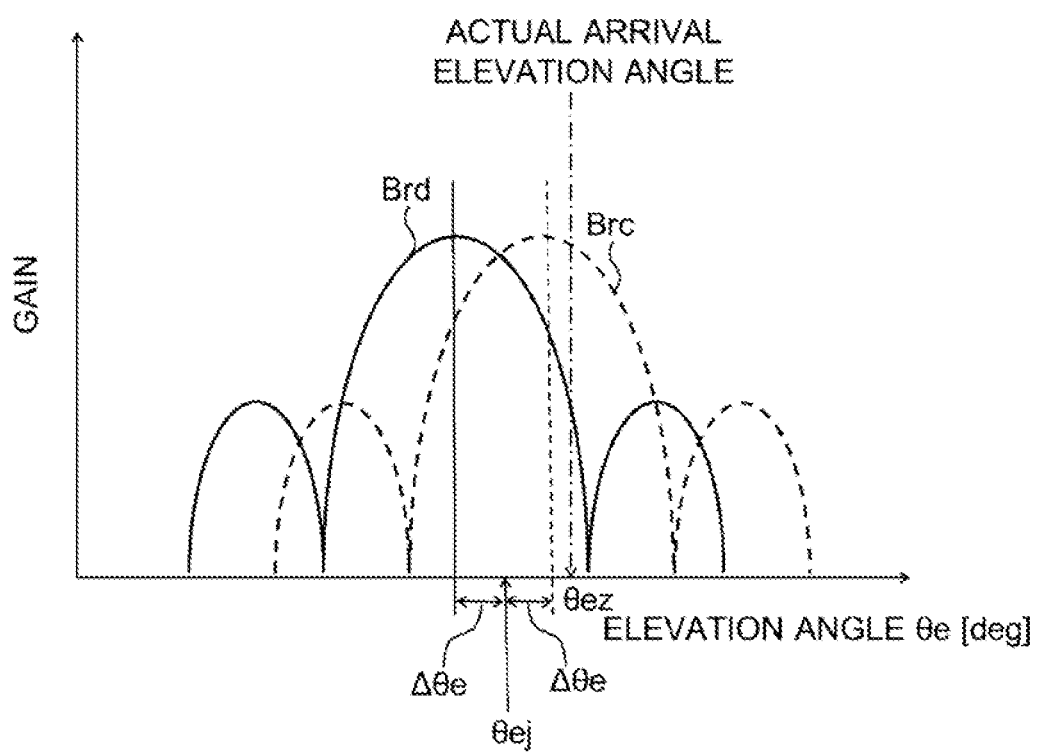
FIG. 17 is a diagram illustrating a second tuning processing.

FIG. 17 is a diagram illustrating the second tuning processing. In the example, the first controller 130 performs the second tuning processing based on the first modified angle. The first controller 130 sets the elevation angle (θej) in the first modified angle larger by Δθe. The first controller 130 forms the receiving beam Br at the angle (θaj+θas, θej+Δθe), and measures the reception level Pr for the radio signals Sg2. In FIG. 17, "Brc" represents a receiving beam Br formed at the angle (θaj+θas, θej+Δθe).

Then, the first controller 130 sets the elevation angle (θej) in the first modified angle smaller by Me. The first controller 130 forms the receiving beam Br at the angle (θaj+θas, θej−Δθe), and measures the reception level Pr of the radio signals Sg2. In FIG. 17, "Brd" represents the receiving beam Br formed at the angle (θaj+θas, θej−Δθe).

Now, it is provided that the actual arrival elevation angle (exact elevation angle) for the radio signals Sg2 is θez. As mentioned above, there is a difference in the reception level Pr due to the gain difference between the receiving beam Brc and the receiving beam Brd.

The first controller 130 calculates the second difference Pd2 on the reception level Pr according to equation (4) as below. Wherein "Prc" is a reception level Pr for the receiving beam Brc, and "Prd" is a reception level Pr for the receiving beam Brd.

$$Pd2 = Prc - Prd \quad (4)$$

In the example of FIG. 17, the actual arrival elevation angle θez for the radio signals Sg2 is smaller than θej+Δθe.

The second difference Pd2 has a positive value. Here, it is provided that the second difference Pd2 is Pdt (>0).

Figure 18:
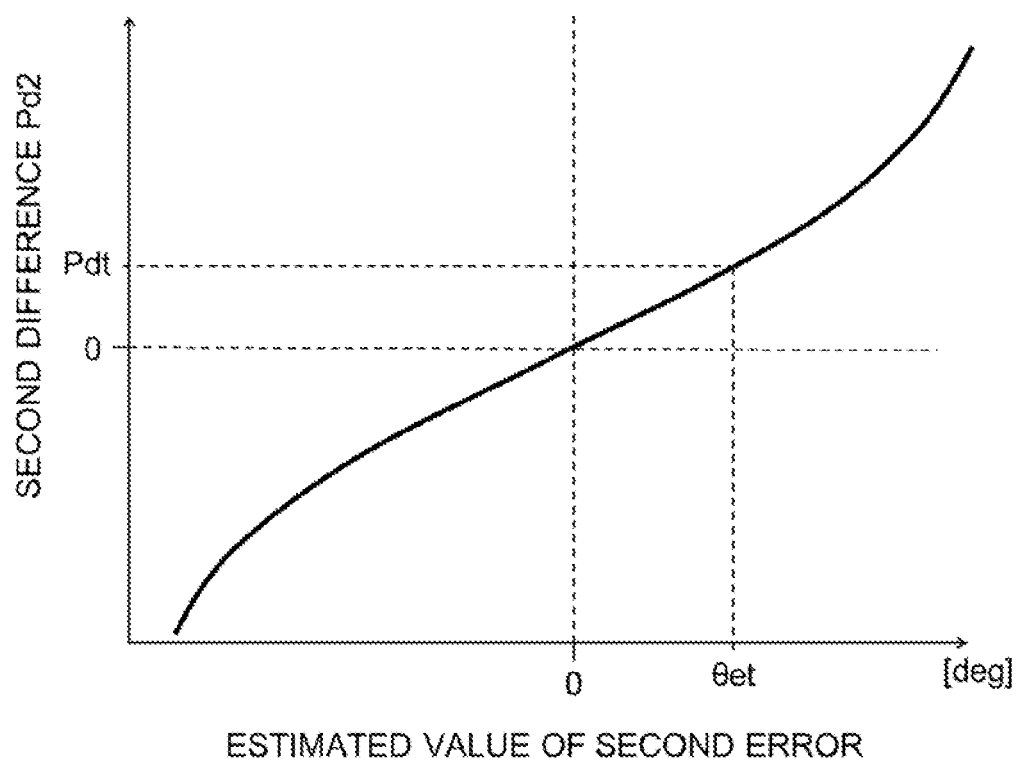
FIG. 18 is a diagram showing an example of a second relationship.

FIG. 18 is a diagram showing an example of a second relationship. The second relationship in the example corresponds to the S curve representing the relationship between the second difference Pd2 and the estimated value of the second error. The S curve is pre-calculated based on the characteristics of the antenna elements 112 included in the first antenna array 111. The information (data) about the second relationship is pre-stored in the first storage section 140.

Note that the slope around zero on the S curve shown in FIG. 18 is determined according to the magnitude of Δθe, and Δθe may be set by taking it into consideration. In another example, Δθe may be set smaller than the second interval In2.

The first controller 130 derives the estimated value (=θet) of the second error by applying the second difference Pd2 (=Pdt) to the second relationship. Wherein θet has a negative value. The first controller 130 modifies the elevation angle (θej) in the first angle by θet. The first controller 130 can modify, using the second relationship, the elevation angle in the first angle with the width of the elevation angle smaller than the second interval In2. Hereinafter, the angle for the receiving beam Br modified in this way is referred to as "second modified angle". Therefore, the second modified angle is (θaj+θas, θej+θet).

Figure 19:
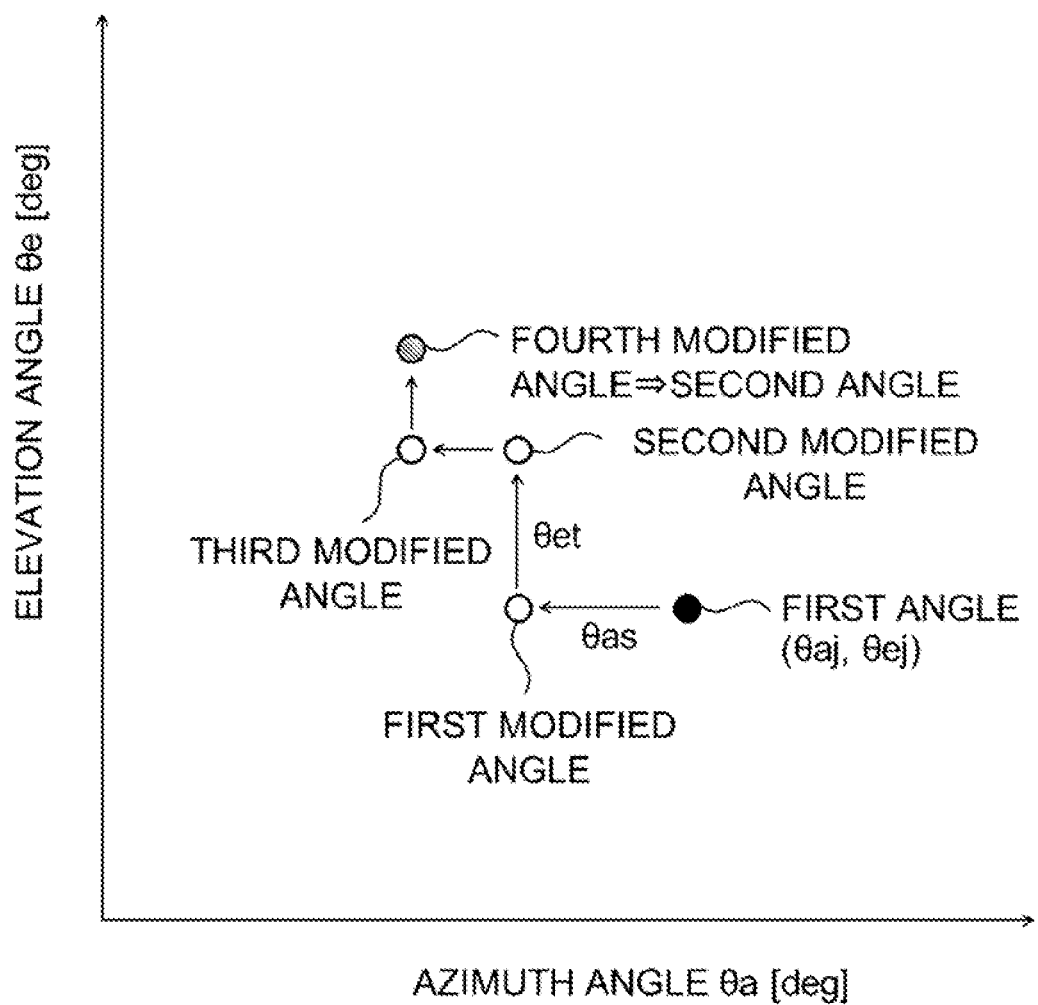
FIG. 19 is a diagram illustrating a flow of the second processing.

FIG. 19 is a diagram illustrating a flow of the second processing. The first controller 130 performs the first tuning processing using the first angle to derive the first modified angle. Then, the first controller 130 performs the second tuning processing using the first modified angle to derive the second modified angle. Subsequently, the first controller 130 performs the first tuning processing using the second modified angle. The angle for the receiving beam Br modified in this way is referred to as "third modified angle". Further, the first controller 130 performs the second tuning processing using the third modified angle. The angle for the receiving beam Br modified in this way is referred to as "fourth modified angle". As mentioned above, the first controller 130 performs the first tuning processing and the second tuning processing alternately.

The first controller 130 determines whether a predetermined convergence condition is met each time of performance of the first tuning processing and the second tuning processing. In the example, the convergence condition is met when the absolute value of the estimated value of the first error and the absolute value of the estimated value of the second error are smaller than or equal to a predetermined threshold Eth. The threshold Eth may be set based on the HPBW. Here, the HPBW for the receiving beam Br is labeled "HPBW3" when using the third antenna arrangement 730. In the example, threshold Eth is 5% of the HPBW3. If the HPBW3 is 8.7 [deg], the threshold Eth is about 0.4 [deg]. In this case, the gain error is smaller than or equal to 0.1 dB. Therefore, the first controller 130 can determine the estimated value of the arrival angle for the radio signals Sg2 with the smaller error than that in the second searching processing. According to the example embodiment, the arrival angle for the radio signals Sg2 can be derived with high accuracy.

In the example, the fourth modified angle satisfies the convergence condition. The first controller 130 derives the estimated value of the first error from the first relationship using the fourth modified angle. The absolute value of the estimated value of the first error derived in this way is smaller than or equal to Eth. Further, the first controller 130 derives the estimated value of the second error from the second relationship using the fourth modified angle. The absolute value of the estimated value of the second error derived in this way is smaller than or equal to Eth. Therefore, as shown in FIG. 19, the first controller 130 determines the fourth modified angle as the second angle.

<3-7. Flow of Processing in First Wireless Communication Apparatus>

Next, with reference to FIG. 20, a flow of processing in the first wireless communication apparatus 100 will be described. The second wireless communication apparatus 200 transmits the radio signals Sg2 at the fixed angle for the transmitting beam Bt. In this situation, the first controller 130 performs the following processing.

Figure 20:
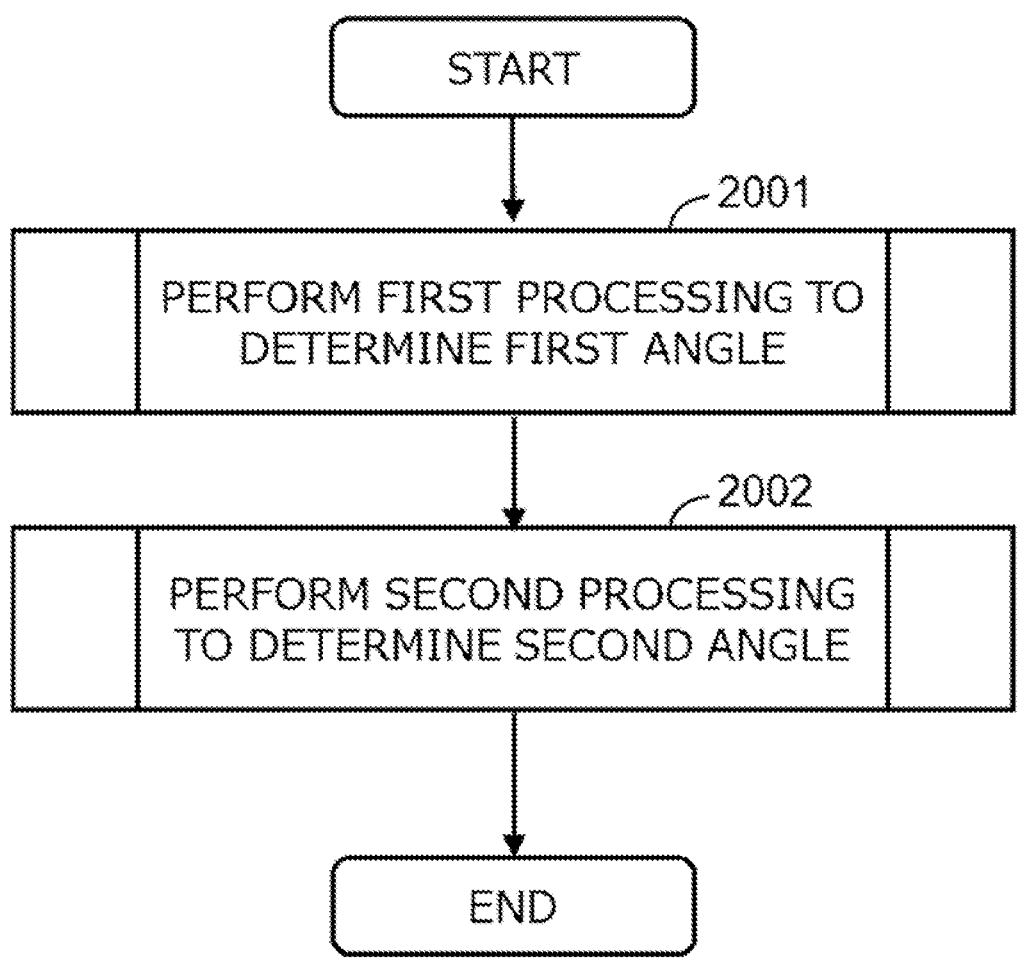
FIG. 20 is a flowchart showing an example of a flow of a processing for estimating an arrival angle for a radio signal.

FIG. 20 is a flowchart showing an example of a flow of a processing for estimating the arrival angle for the radio signals Sg2. The first controller 130 performs the first processing to determine the first angle (2001). The first controller 130 performs the second processing to determine the second angle (2002).

Figure 21:
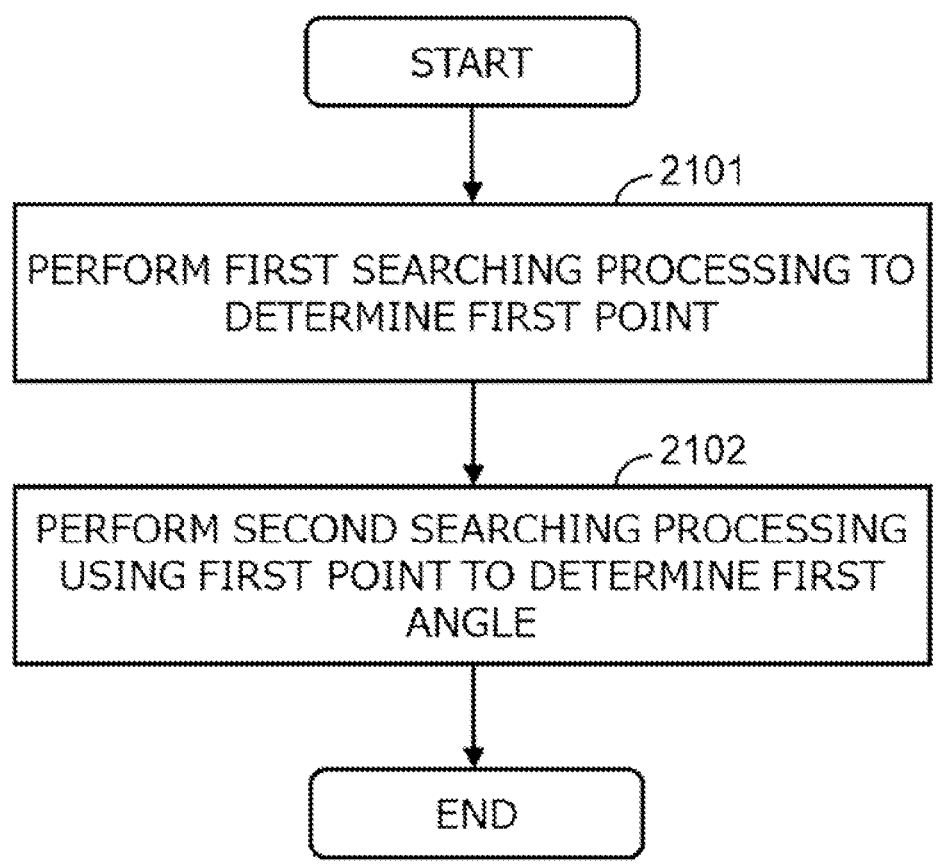
FIG. 21 is a flowchart showing an example of a flow of a processing in step 2001 of FIG. 20.

FIG. 21 is a flowchart showing an example of the flow of the processing in step 2001 of FIG. 20. The first controller 130 performs the first searching processing to determine the first point p1i as mentioned above (2101). Then, the first controller 130 performs the second searching processing using the first point p1i to determine the second point p2i as mentioned above. The first controller 130 determines the second point p2i as the first angle (2102).

Figure 22:
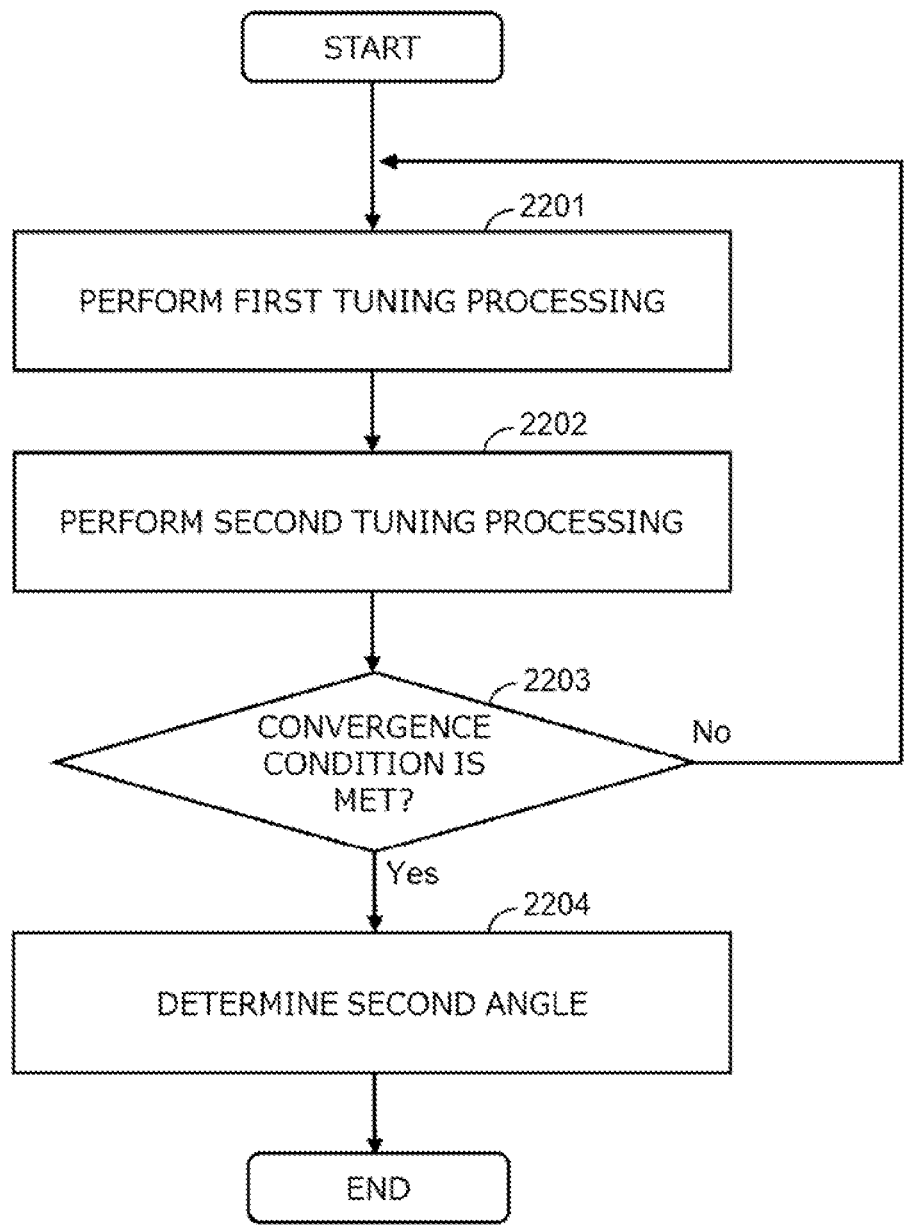
FIG. 22 is a flowchart showing an example of a flow of a processing in step 2002 of FIG. 20.

FIG. 22 is a flowchart showing an example of the flow of the processing in step 2002 of FIG. 20. The first controller 130 performs the first tuning processing as mentioned above (2201). Then, the first controller 130 performs the second tuning processing as mentioned above (2202).

Then, the first controller 130 determines whether the convergence condition is met (2203). If the convergence condition is not met, the first controller 130 returns to step 2201. That is, the first controller 130 performs the first tuning processing and the second tuning processing repeatedly until the convergence condition is met.

If the convergence condition is met, the first controller 130 determines the modified angle derived at that point as the second angle.

<3-8. Flow of Processing in Second Wireless Communication Apparatus>

The above-described flow of processing is applicable to a flow of processing for the second wireless communication apparatus 200 of estimating the arrival angle for the radio signal Sg1 transmitted by the first wireless communication apparatus 100. The second wireless communication apparatus 200 (i.e. second controller 230) performs the processing described in FIG. 20 to FIG. 22 in the situation in which the first wireless communication apparatus 100 transmits the radio signal Sg1 at the fixed angle for the transmitting beam Bt.

<3-9. Effect>

An example of actual calculation will be described below. FIG. 23 is a diagram illustrating a specific example of a processing for estimating the arrival angle for the radio signal Sg2. In the example, the gain for the antenna is 20.3 [dBi].

Figure 24:
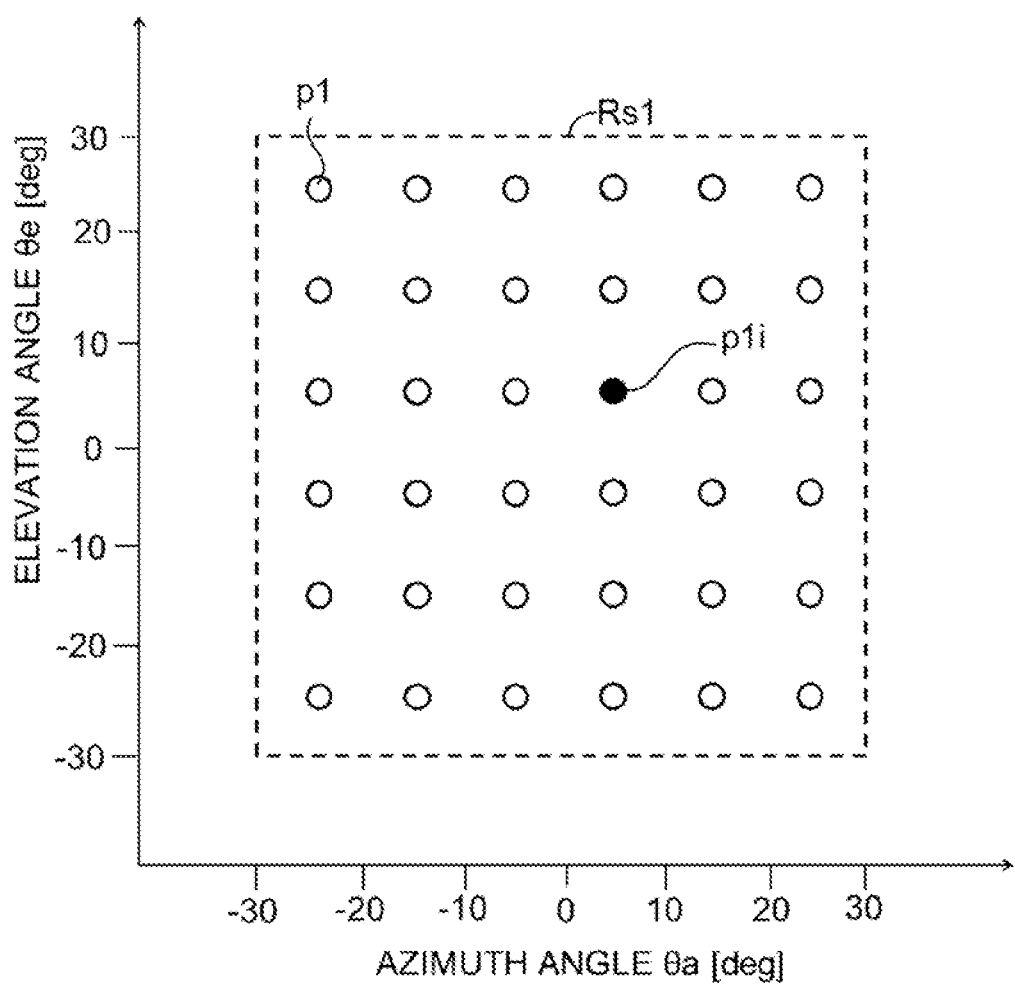
FIG. 24 is a diagram illustrating the first searching processing in an example of FIG. 23.

FIG. 24 is a diagram illustrating the first searching processing in an example of FIG. 23. The first controller 130 selects the 4×4 array shown in FIG. 7 as the first antenna arrangement 710. The first controller 130 can perform the first searching processing using such arrangement with permitting the reduction of gain by about 10.2 dB. The first controller 130 sets the range of −30[deg] to 30[deg] as the first search range Rs1 for the azimuth angle θa. The first controller 130 sets the range of −30[deg] to 30[deg] as the first search range Rs1 for the elevation angle θe. The first controller 130 sets thirty-six first search points p1 in the first search range Rs1. In the example, the thirty-six first search points p1 are set from (−25, 25) points in the 6×6 lattice pattern. The first interval In1 is 10[deg]. The first controller 130 performs the first searching processing to set (5, 5) as the first point p1i.

Figure 25:
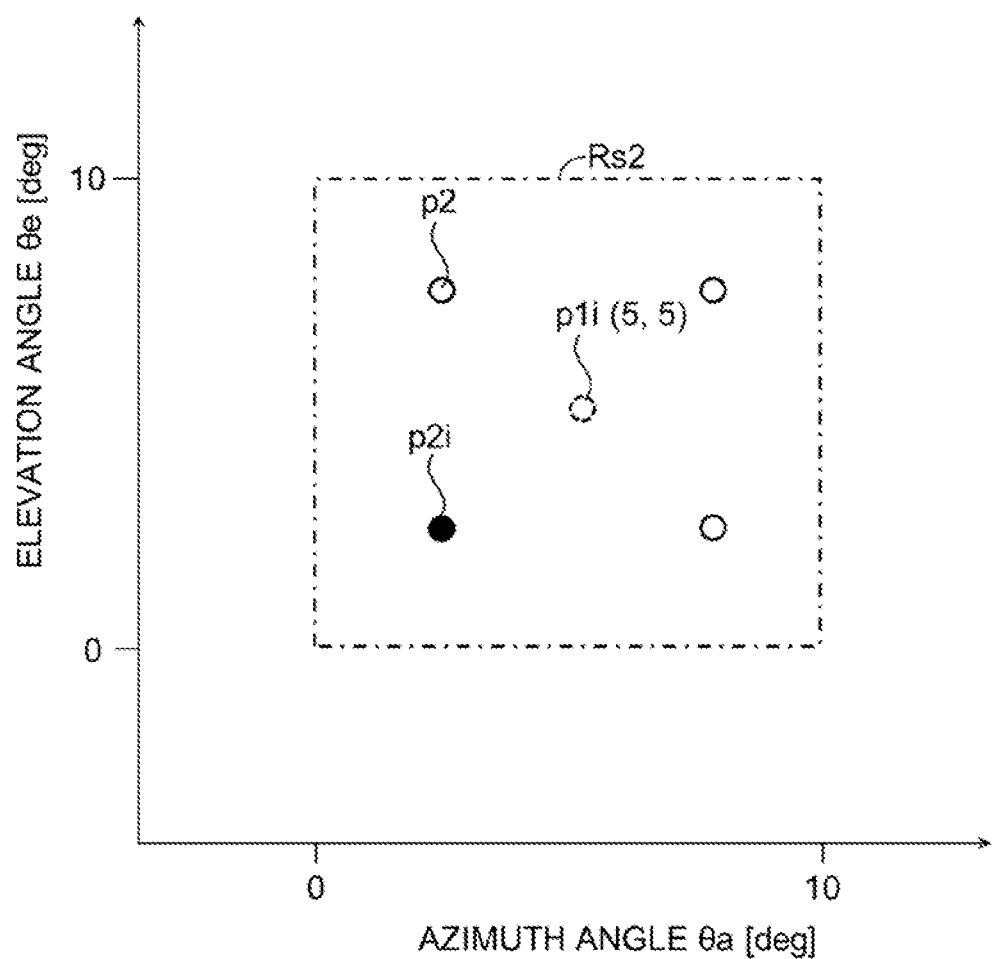
FIG. 25 is a diagram illustrating the second searching processing in an example of FIG. 23.

FIG. 25 is a diagram illustrating the second searching processing in an example of FIG. 23. The first controller 130 selects the 8×8 array shown in FIG. 10 as the second antenna arrangement 720. The first controller 130 sets the second search range Rs2 using the first point p1i. The border of the second search range Rs2 is set between the first point p1i and the first search points p1 adjacent to the first point p1i (i.e. factor k=0.5). Therefore, the first controller 130 sets the range of 0[deg] to 10[deg] as the second search range Rs2 for the azimuth angle θa. The first controller 130 sets the range of 0[deg] to 10[deg] as the second search range Rs2 for the elevation angle θe. The first controller 130 sets four second search points p2 in the second search range Rs2. The four second search points p2 are set from (2.5, 7.5) points in the 2×2 lattice pattern. The second interval In2 is 5[deg]. The first controller 130 performs the second searching processing to set (2.5, 2.5) as the second point p2i. Then, the first controller 130 determines (2.5, 2.5) as the first angle.

The first controller 130 selects the 8×8 array shown in FIG. 14 as the third antenna arrangement 730. Then, the first controller 130 performs the first tuning processing and the second tuning processing as a basis of the first angle (2.5, 2.5). The first controller 130 determines that the convergence condition is met at the time when performing the combination of the first tuning processing and the second tuning processing five times. Therefore, as shown in FIG. 23, the number of search points is 10 in the second processing. From the above, the sum of the search points is 50 in the example.

In contrast, it is provided that the above simple searching method is performed for the first search range Rs1 shown in FIG. 24. For example, a plurality of search points are set in 5[deg] interval in the first search range Rs1. Since the first search range Rs1 has the 60[deg] width for the azimuth angle θa and 60[deg] width for the elevation angle θe, the number of search points is above 100. If the search points are also set on the border of the first search range Rs1, the number of search points is 169. The number of search points is very large, so it takes much time for the searching processing. Further, the accuracy in estimating the arrival angle for the radio signals Sg2 is less relative to the example embodiment because the simple searching method can only search at 5 [deg] interval.

According to the example embodiment, the arrival angle for the radio signal Sg2 can be searched accurately comparing to the simple searching method, and it can reduce the time taken for searching (i.e. the number of search points comparing to the simple searching method).

Further, when both of the first wireless communication apparatus 100 and the second wireless communication apparatus 200 perform the processing shown in FIG. 20 to FIG. 22, the above-mentioned effect is remarkable. For example, the number of search points in the first searching processing is 1296 (=$36^2$), and the number of search points in the second searching processing is 8 (=2×4). The number of search points in the second processing is 20 (=2×10). The sum of the search points is 1324. In contrast, the sum of search points in the simple searching method is 28,561

(=169²). According to the example embodiment, the number of search points can be considerably reduced comparing to the simple searching method.

<3-10. Example Alteration>

The technique according to the present disclosure is not limited to the example embodiment as described above.

(1) First Example Alteration

The first wireless communication apparatus 100 may not comprise the first switch 120. The first controller 130 may adjust the weighting factor on the received signal received by each of the plurality of antenna elements 112 to control the directivity and select the antenna elements 112.

(2) Second Example Alteration

The first processing may include single searching processing only. For example, the first controller 130 may perform the first searching processing to determine the first point p1i as the first angle. Considering the accuracy of the arrival angle for the radio signals Sg2 and the number of search points, the number of antennas included in the first antenna arrangement 710 may be larger than sixteen (=4×4), and smaller than sixty-four (=8×8). For example, the first controller 130 selects thirty-six antenna elements 112 (e.g. 6×6 array) as the first antenna arrangement 710 and performs the first searching processing. Subsequently, first controller 130 selects sixty-four antenna elements 112 (8×8 array) as the third antenna arrangement 730. Then, the first controller 130 performs the second processing to determine the second angle using the first angle as mentioned above (i.e. first point p1i).

(3) Third Example Alteration

The first antenna arrangement 710 and the second antenna arrangement 720 are not limited to the example embodiment as described above. The first controller 130 may set the first antenna arrangement 710 and the second antenna arrangement 720 in any arrangement respectively as long as the relationship of n1<n2 is satisfied. For example, the first controller 130 may select thirty-six antenna elements 112 (e.g. 6×6 array) as the first antenna arrangement 710 and select sixty-four (8×8 array) as the second antenna arrangement 720.

(4) Fourth Example Alteration

Figure 26:
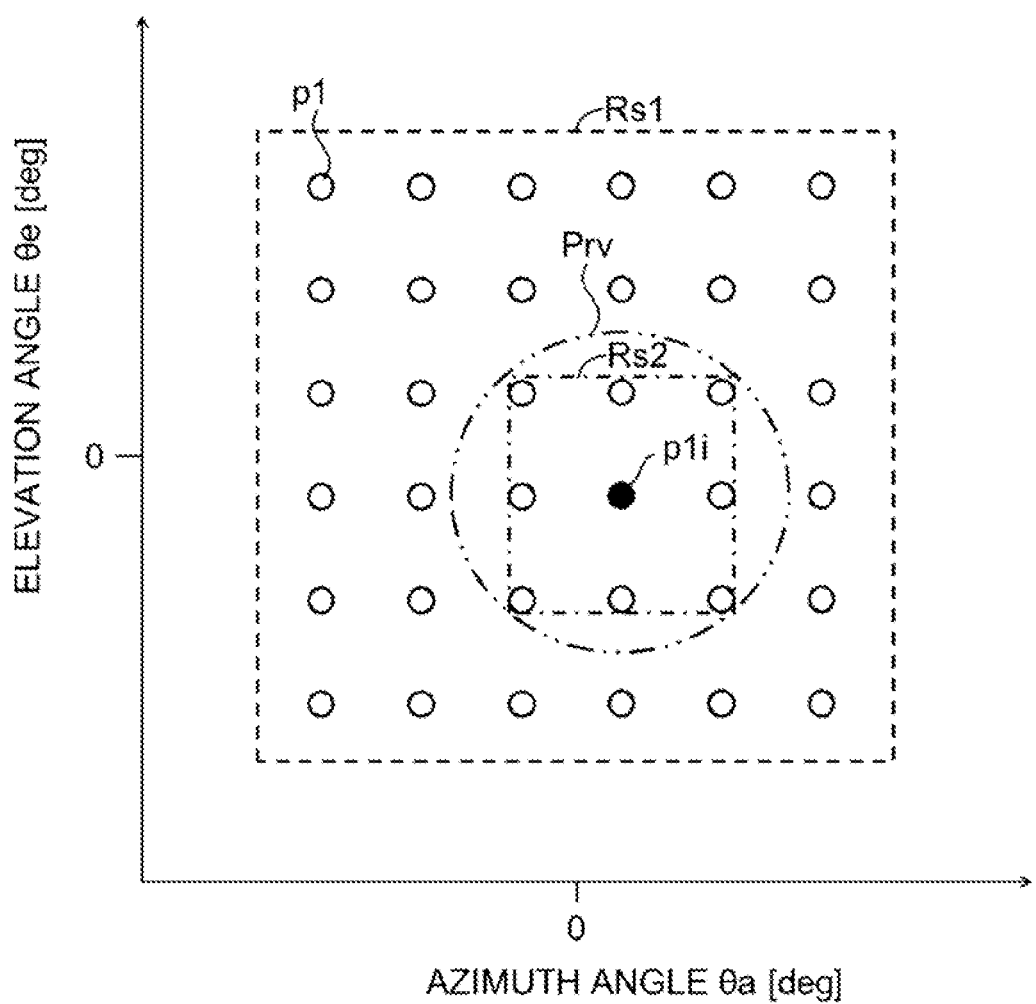
FIG. 26 is a diagram illustrating an example of a method of setting the second search range.

The method of setting the second search range Rs2 is not limited to the example embodiment as described above. FIG. 26 is a diagram illustrating an example of a method of setting the second search range Rs2. The first controller 130 may set the second search range Rs2 as to include the first search points p1 at which a difference with the reception level Pr for the first point p1i is smaller than or equal to a predetermined difference level Gsh. The difference level Gsh is 3 [dB] for example. In FIG. 26, "Prv" is a contour indicating the position at which the reception level Pr decreases from the reception level Pr for the first point p1i by the difference level Gsh. The magnitude of difference between the respective reception level Pr for eight first search points p1 around the first point p1i and the reception level Pr for the first point p1i is smaller than or equal to the difference level Gsh. Therefore, the first controller 130 sets the second search range Rs2 as to include the eight first search points p1.

(5) Fifth Example Alteration

The flow of the second processing is not limited to the example embodiment as described above. The order of step 2201 (first tuning processing) and the step 2202 (second tuning processing) may be reversed.

In another example, the first controller 130 may not perform the first tuning processing and the second tuning processing alternately. The first controller 130 may perform the first tuning processing repeatedly until the first convergence condition is met. Subsequently, the first controller 130 may perform the second tuning processing repeatedly until the second convergence condition is met. The first convergence condition may be the condition that the estimated value of the first error is smaller than or equal to the threshold Eth. The second convergence condition may be the condition that the estimated value of the second error is smaller than or equal to the threshold Eth. In this way, the first controller 130 may converge one of the azimuth angle θa and the elevation angle θe for the receiving beam Br, and subsequently may converge another.

(6) Sixth Example Alteration

Figure 27:
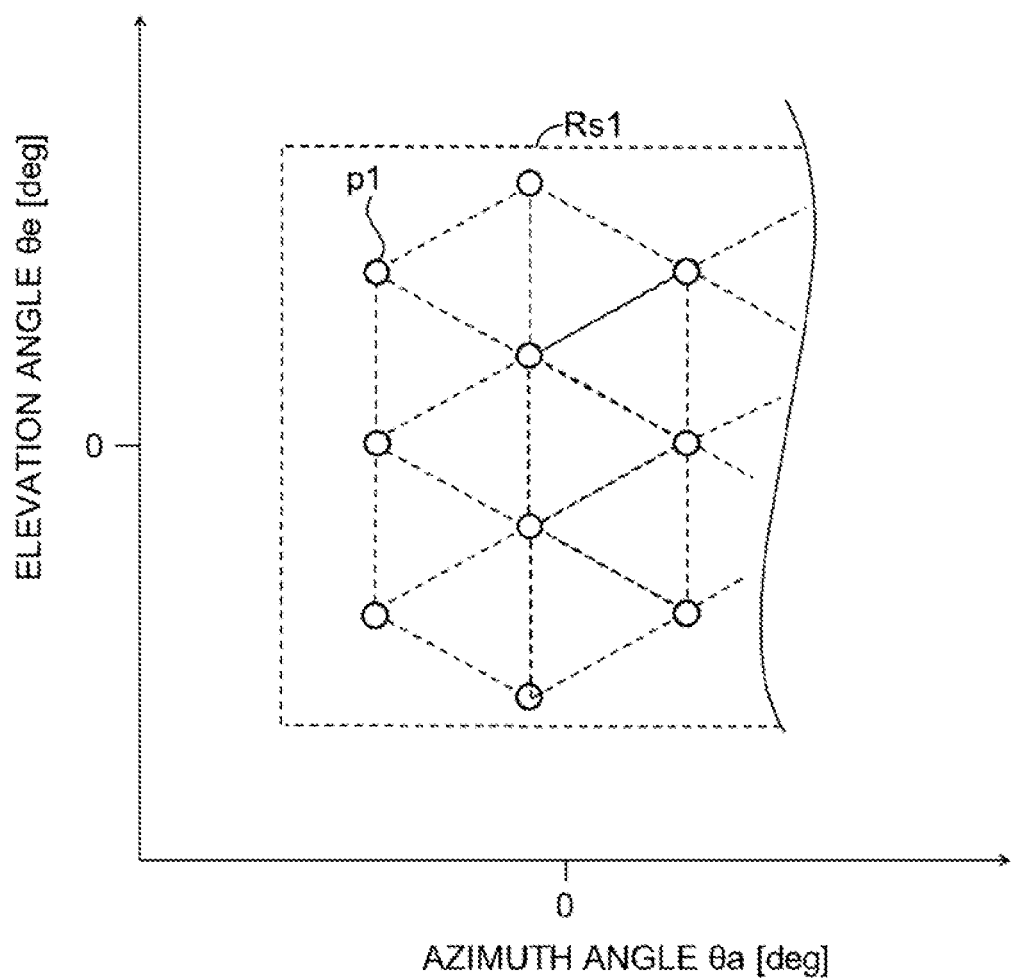
FIG. 27 is a diagram showing an example of arrangement of a plurality of first search points.

The arrangement of the first search points p1 and the arrangement of the second search points p2 are not limited to the example embodiment as described above. FIG. 27 is a diagram showing an example of the arrangement of the plurality of first search points p1. The first controller 130 may set the plurality of first search points p1 in a triangle arrangement. Similarly, the first controller 130 may set the plurality of second search points p2 in the triangle arrangement. According to the configuration, the number of search points can be reduced because the overlap of the receiving beam Br is reduced between adjacent search points. That is, the first controller 130 can perform the first searching processing and the second searching processing efficiently.

(7) Seventh Example Alteration

Figure 28:
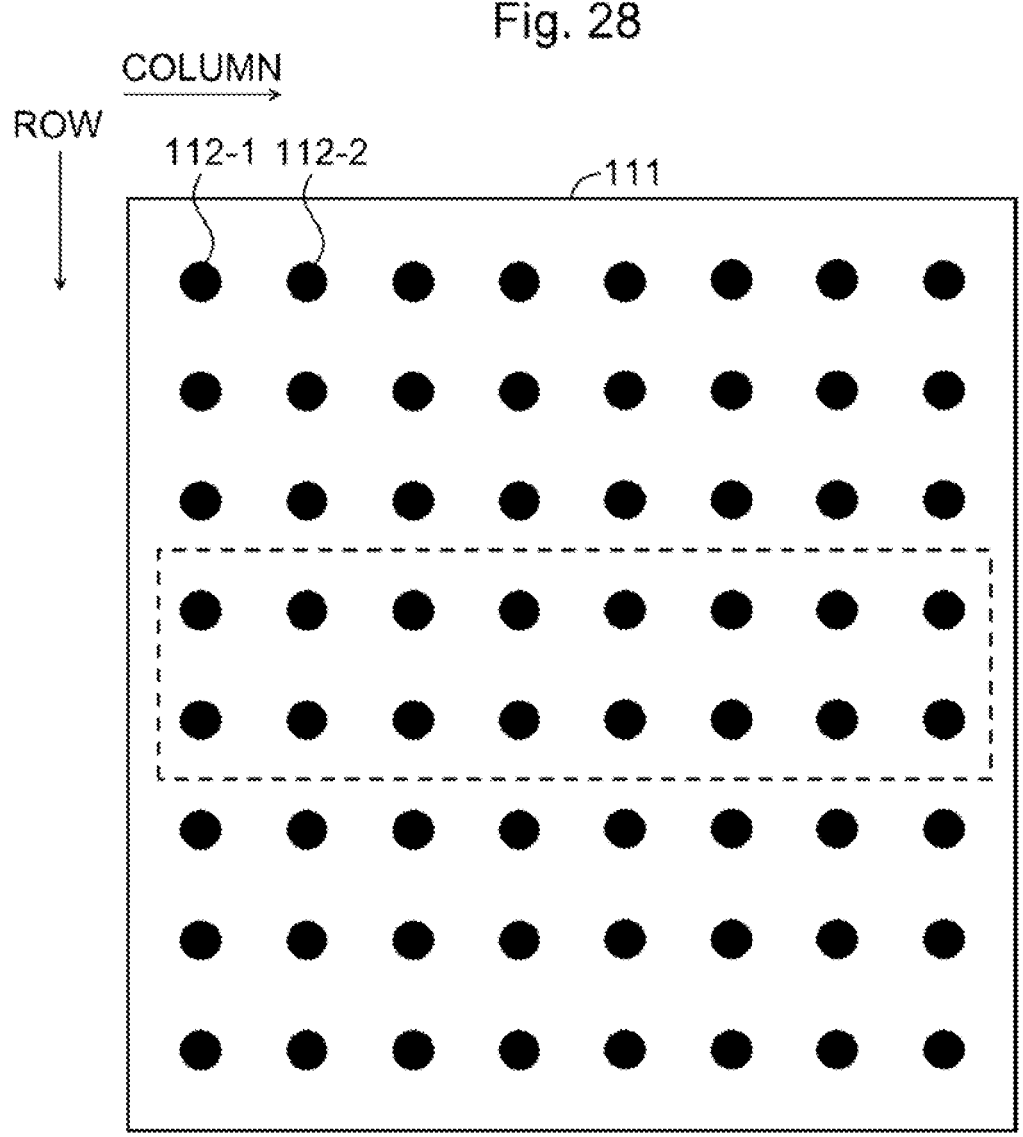
FIG. 28 is a diagram showing an example of selecting the antenna elements.
Figure 29:
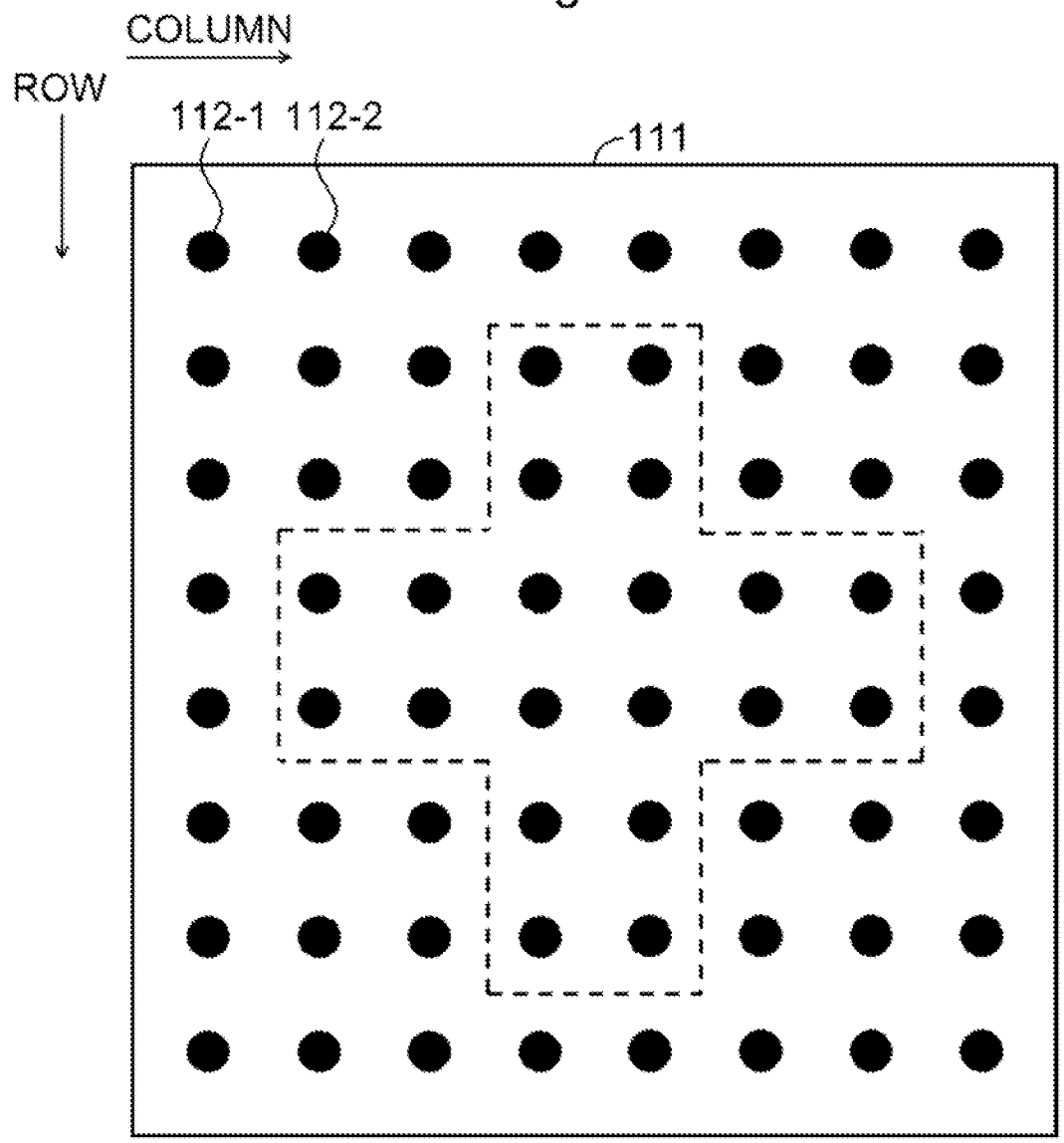
FIG. 29 is a diagram showing an example of selecting the antenna elements.
Figure 30:
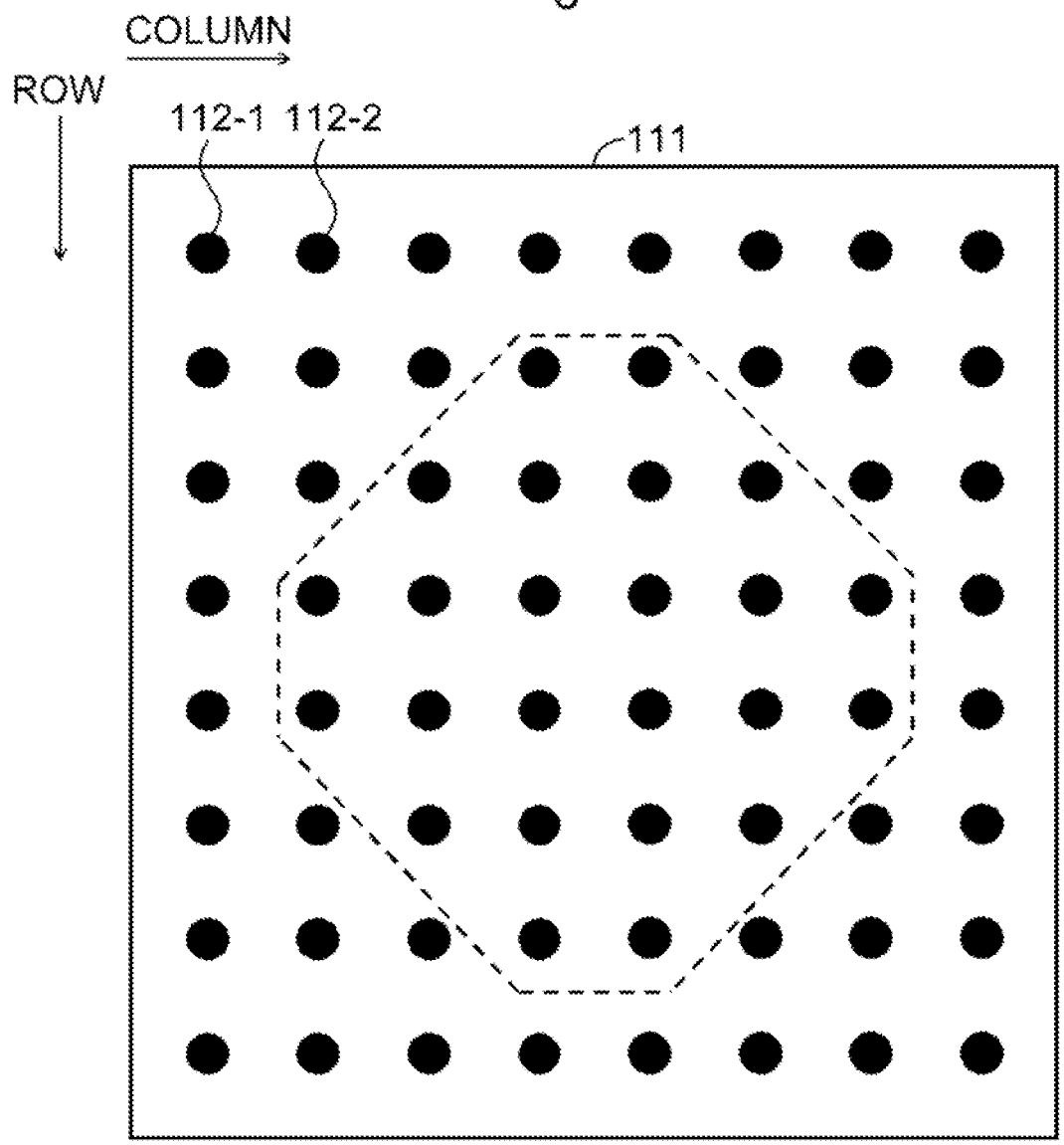
FIG. 30 is a diagram showing an example of selecting the antenna elements.

The way of selecting the antenna elements 112 is not limited to the example embodiment as described above. The first controller 130 may set the first antenna arrangement 710, the second antenna arrangement 720 and the third antenna arrangement 730 in any arrangement respectively as long as the relationship of n1<n2<=n3 is satisfied. FIG. 28 to FIG. 30 are a diagram showing an example of selecting the antenna elements 112 respectively. As shown in FIG. 28, the first controller 130 may select the antenna elements 112 such that the number of antenna elements 112 in a column direction is larger than the number of antenna elements 112 in a row direction. The first controller 130 may select the antenna elements 112 such that the number of antenna elements 112 in the row direction is larger than the number of antenna elements 112 in the column direction. As shown in FIG. 29, the first controller 130 may select the antenna elements 112 in a cross arrangement. In this case, the width of the receiving beam Br can be increased comparing to the case of selecting the antenna elements 112 in the 6×6 array. As shown in FIG. 30, the first controller 130 may select the antenna elements 112 such that the number of antenna elements 112 in the column direction is gradually reduced and the number of antenna elements 112 in the row direction is gradually reduced outward from the center of the first antenna array 111.

(8) Eighth Example Alteration

The first wireless communication apparatus 100 and the second wireless communication apparatus 200 may be configured to communicate each other in a time division duplex (TDD) system. In this case, the first wireless communication apparatus 100 and the second wireless communication apparatus 200 can estimate the arrival angle for the radio signal while performing the transmission and reception alternately.

The first wireless communication apparatus 100 and the second wireless communication apparatus 200 may be configured to communicate each other in a frequency division duplex (FDD) system. In this case, the first wireless communication apparatus 100 and the second wireless communication apparatus 200 can estimate the arrival angle for the radio signal while communicating simultaneously at different frequencies. Note that in the case that the first wireless communication apparatus 100 and the second wireless communication apparatus 200 communicates in the FDD system, the HPBW may be different even if the number of antenna elements 112 selected by the first wireless communication apparatus 100 and the number of antenna elements 212 selected by the second wireless communication apparatus 200 are the same. Therefore, the first wireless communication apparatus 100 may set the first interval In1 and the second interval In2 depending on the frequency used in communicating with the second wireless communication apparatus 200. The second wireless communication apparatus 200 may set the first interval In1 and the second interval In2 depending on the frequency used in communicating with the first wireless communication apparatus 100.

Note that when the first wireless communication apparatus 100 and the second wireless communication apparatus 200 perform the first processing simultaneously, the gain is more decreased. One of the first wireless communication apparatus 100 and the second wireless communication apparatus 200 may perform the first processing using the larger number of antenna elements than the number of antenna elements in another one. In this case, the gain is less decreased.

(8) Ninth Example Alteration

In the above example, in the condition in which the second wireless communication apparatus 200 transmits the radio signals Sg2 at the fixed angle for the transmitting beam Bt, the first wireless communication apparatus 100 changes the angle for the receiving beam Br to estimate the arrival angle for the radio signals Sg2. The first wireless communication apparatus 100 may estimate the arrival angle for the radio signals Sg2 using the method other than this method.

For example, the second wireless communication apparatus 200 fixes the angle for the receiving beam Br in a specific angle (for example, second angle derived in the above-mentioned example embodiment). The first controller 130 controls the transmitting beam Bt for transmitting the radio signal Sg1 to the second wireless communication apparatus 200. More specifically, the first controller 130 changes, using the plurality of antenna elements 112 selected in the first antenna array 111, the azimuth angle θa and the elevation angle θe to determine the first angle. The first angle is the combination of the azimuth angle θa and the elevation angle θe for the transmitting beam Bt.

In this configuration, the first controller 130 transmits to the second wireless communication apparatus 200, the information about the current angle for the transmitting beam Bt (azimuth angle θa and elevation angle θe). The second controller 230 of the second wireless communication apparatus 200 measures the reception level Pr for the radio signal Sg1. The second controller 230 associates the information about the angle for the transmitting beam Bt with the reception level Pr. Then, the second controller 230 transmits the first wireless communication apparatus 100, the information for which the information about the angle for the transmitting beam Bt is associated with the reception level Pr (hereinafter referred to as "reception level information"). The first controller 130 receives the reception level information. The first controller 130 performs, using the reception level information, the first processing to determine the angle (first angle) for the transmitting beam Bt at which the reception level Pr is largest in the second wireless communication apparatus 200 in the same way as the example embodiment as described above.

Further, the first controller 130 changes, using a number of antenna elements 112 larger than the number of antenna elements 112 used in the first processing, the azimuth angle θa and the elevation angle θe for the transmitting beam Bt separately from the first angle to determine the second angle. The second angle is the final combination of the azimuth angle θa and the elevation angle θe for the transmitting beam Bt. The first controller 130, using the reception level information, performs the second processing to determine the angle (second angle) for the transmitting beam Bt at which the convergence condition is satisfied in the same way as the example embodiment as described above.

In this way, the first controller 130 changes the angle for the transmitting beam Bt. The first controller 130 receives the reception level information from the second wireless communication apparatus 200. Then, the first controller 130 performs the first processing and the second processing using the reception level information. Also in this configuration, the first controller 130 can estimate the second angle as the arrival angle for the radio signals Sg2 (in the direction in which the second wireless communication apparatus 200 is located). Note that in other example, the second wireless communication apparatus 200 may transmit the information about the reception level Pr to the first wireless communication apparatus 100 in real time. Then, the first controller 130 may associate the information about the angle for the transmitting beam Bt with the reception level Pr.

(8) Tenth Example Alteration

Although in the above example embodiment, the first controller 130 changes (steer) the receiving beam Br in a two-dimensional direction (azimuth angle θa and elevation angle θe) to perform the first processing and the second processing, it is not limited to the example. The first controller 130 may change (steer) the receiving beam Br in a single direction to perform the first processing and the second processing. It is supposed that the first controller 130 wish to search only one of the azimuth angle θa and the elevation angle θe for the receiving beam Br as such example. It is provided that the first controller 130 searches the azimuth angle θa for the receiving beam Br. The first controller 130 performs the first processing for changing the receiving beam Br in a direction of the azimuth angle θa (first direction) to determine the first angle for the receiving beam Br (coarse estimated value of the azimuth angle θa). Then, the first controller 130 performs the second processing for changing the receiving beam Br from the first angle in a direction of the azimuth angle θa (first direction) to determine second angle as the final azimuth angle θa at which the radio signals Sg2 is received. The details of the first processing and the second processing are similar to the above description.

4. SECOND EXAMPLE EMBODIMENT

Next, with reference to FIG. 31 to FIG. 32, the second example embodiment will be described. The above-mentioned first example embodiment is a concrete example embodiment, whereas the second example embodiment is a more generalized example embodiment.

<4-1. Configuration Wireless Communication Apparatus>

Figure 31:
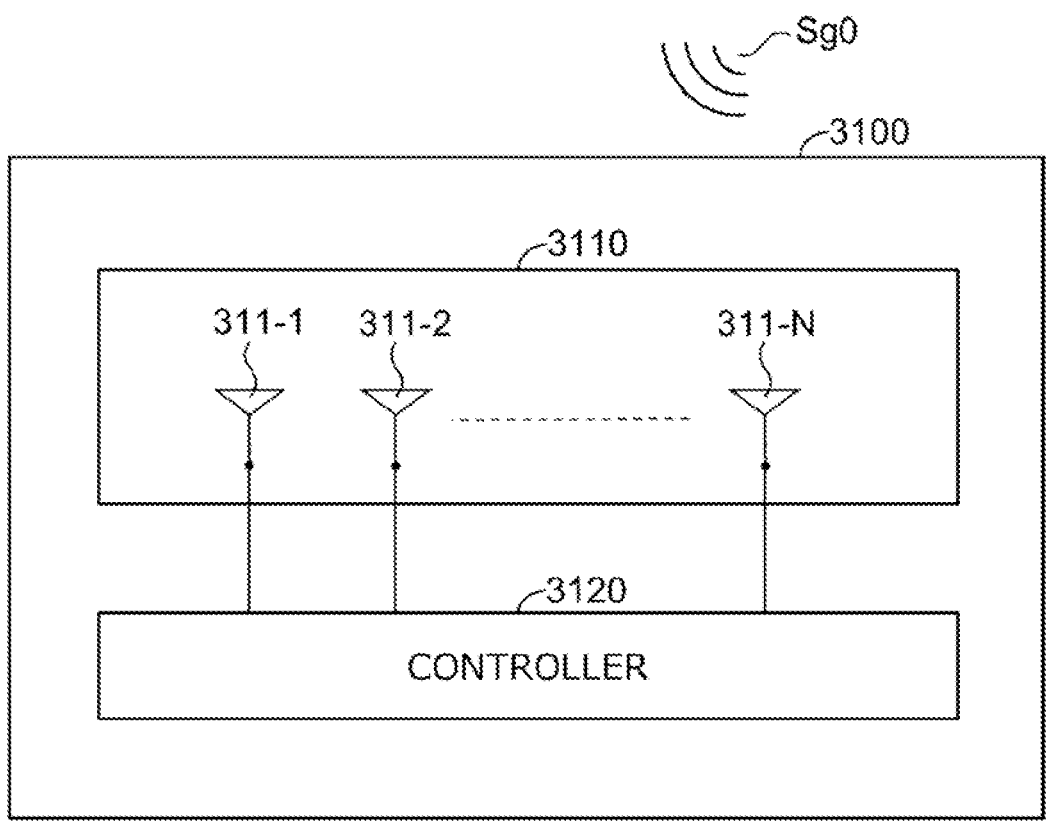
FIG. 31 is a diagram showing an example configuration of a wireless communication apparatus according to a second example embodiment.

FIG. 31 is a diagram showing an example configuration of a wireless communication apparatus 3100. The wireless communication apparatus 3100 comprises an antenna array 3110 and a controller 3120.

The antenna array 3110 includes plurality of antenna elements 311-1, 311-2, . . . , 311-N. The antenna array 3110 may comprise the configuration as that in the first antenna array 111. Hereinafter, one or more antenna elements are referenced "311" if it is not necessary to distinguish between respective antenna elements.

The controller 3120 may be implemented by one or more processors and memory. The one or more processors may include a CPU, a MPU and a micro-controller for example. The memory may include a volatile memory and a non-volatile memory. The memory may store a program code (instruction). The one or more processors may implement a function of the controller 3120 by executing the program code stored in the memory.

The controller 3120 controls the receiving beam Br for receiving the radio signal Sg0 transmitted from other wireless communication apparatus. The receiving beam Br is formed by the antenna array 3110.

The controller 3120 performs the first processing. The first processing is for changing, using the plurality of antenna elements 311 selected in the antenna array 3110, the azimuth angle θa and the elevation angle θe for the receiving beam Br to determine the first angle. The first angle is the combination of the azimuth angle θa and the elevation angle θe for the receiving beam Br.

Further, the controller 3120 performs the second processing. The second processing is for changing, using a number of antenna elements 311 larger than or equal to the number of antenna elements 311 used in the first processing, the azimuth angle θa and the elevation angle θe separately from the first angle to determine the second angle. The second angle is the final combination of the azimuth angle θa and the elevation angle θe for the receiving beam Br.

The controller 3120 may operate in the same way as the first controller 130. That is, the controller 3120 may perform the first processing in the same way as in the first example embodiment and its example alterations. The controller 3120 may perform the second processing in the same way as in the first example embodiment and its example alterations.

The controller 3120 may perform the first processing using some of the plurality of antenna elements 311, and perform the second processing using all of the plurality of antenna elements 311.

<4-2. Flow of Processing>

FIG. 32 is a flowchart illustrating an example flow of the processing in the wireless communication apparatus 3100. The controller 3120 performs the first processing to determine the first angle (3201). The controller 3120 performs the second processing to determine the second angle (3202).

According to the above configuration, the communication apparatus 3100 can perform the first processing and the second processing in stages to estimate the arrival angle for the radio signal Sg0 as the second angle. The wireless communication apparatus 3100 can estimate the arrival angle for the radio signal Sg0 accurately, and reduce the time for the estimation comparing to the simple searching method.

Note that the example embodiments and the example alterations as described above are merely examples, and the scope of technical ideas of the present disclosure is not limited to the configurations as described above. Other example aspects conceivable within the scope of technical ideas of the present disclosure are included in the scope of the present disclosure.

The functions of the apparatuses (the first wireless communication apparatus 100, the second wireless communication apparatus 200 and the wireless communication apparatus 3100) as described herein may be implemented with any of software, hardware, and a combination of software and hardware. A program code (instructions) consisting in the software may be stored in a computer readable recording medium inside or outside each of the apparatuses, for example, and when being executed, may be read in a memory to be executed by a processor. Moreover, non-transitory computer readable recording media (non-transitory computer readable media) having recorded thereon the program code may be provided.

The whole or part of the example embodiments and the example alterations described above can be described as, but not limited to, the following supplementary notes.

(Supplementary Note 1)

A wireless communication apparatus comprising:

an antenna array including a plurality of antenna elements; and a controller for controlling a receiving beam formed by the antenna array, the receiving beam being for receiving a radio signal transmitted by another wireless communication apparatus, wherein the controller:

performs a first processing for changing, using a plurality of antenna elements selected in the antenna array, an azimuth angle and an elevation angle for the receiving beam to determine a first angle that is a combination of the azimuth angle and the elevation angle; and performs a second processing for changing, using a number of antenna elements larger than or equal to a number of antenna elements used in the first processing, the azimuth angle and the elevation angle separately from the first angle to determine a second angle that is a final combination of the azimuth angle and the elevation angle.

(Supplementary Note 2)

The wireless communication apparatus according to supplementary note 1, wherein the first processing includes a first searching processing and a second searching processing, the first searching processing includes:

changing, using a first number of antenna elements, the azimuth angle and the elevation angle in a first search range defined by the combination of the azimuth angle and the elevation angle; and determining, from the first search range, a first point at which a reception level for the radio signal has a largest value, the second searching processing includes:

changing, using a second number of antenna elements larger than or equal to the first number, the azimuth angle and the elevation angle in a second search range defined by the combination of the azimuth angle and the elevation angle; and determining, from the second search range, a second point at which the reception level for the radio signal has a largest value as the first angle, the second search range includes the first point and is smaller than the first search range.

(Supplementary Note 3)

The wireless communication apparatus according to supplementary note 2, wherein the first search range includes a plurality of first search points defined by the combination of the azimuth angle and the elevation angle, the second search range includes a plurality of second search points defined by the combination of the azimuth angle and the elevation angle, and an interval between the second search points adjacent from each other is smaller than an interval between the first search points adjacent from each other.

(Supplementary Note 4)

The wireless communication apparatus according to supplementary note 3, wherein the interval between the second search points adjacent from each other and the interval between the first search points adjacent from each other are set using a half power beam width (HPBW) for the receiving beam.

(Supplementary Note 5)

The wireless communication apparatus according to supplementary note 3, wherein a border of the second search range is set between the first search points corresponding to the first point and the first search points adjacent to the first point.

(Supplementary Note 6)

The wireless communication apparatus according to supplementary note 3, wherein the second search range is set to include the first search point at which a difference with the reception level for the first point is smaller than or equal to a predetermined difference level.

(Supplementary Note 7)

The wireless communication apparatus according to supplementary note 2, wherein the controller:

performs the second searching processing using all the antenna elements included in the antenna array; and performs the second processing using all the antenna elements included in the antenna array.

(Supplementary Note 8)

The wireless communication apparatus according to any one of supplementary notes 1 to 7, wherein the second processing includes a first tuning processing and a second tuning processing, the first tuning processing includes modifying the azimuth angle in the first angle using a first relationship, the first relationship represents a relationship between a first error corresponding to an error between an actual arrival azimuth angle for the radio signal and an estimated arrival azimuth angle for the radio signal, and a gain difference caused due to the first error, and the second tuning processing includes modifying the elevation angle in the first angle using a second relationship, the second relationship represents a relationship between a second error corresponding to an error between an actual arrival elevation angle for the radio signal and an estimated arrival azimuth angle for the radio signal, and a gain difference caused due to the second error.

(Supplementary Note 9)

The wireless communication apparatus according to supplementary note 8, wherein the controller performs the first tuning processing and the second tuning processing alternately.

(Supplementary Note 10)

The wireless communication apparatus according to supplementary note 8 or 9, wherein the controller performs the first tuning processing and the second tuning processing repeatedly until a convergence condition for the first error and the second error is met.

(Supplementary Note 11)

A method performed in a wireless communication apparatus comprising an antenna array including a plurality of antenna elements, the method comprising:

controlling a receiving beam formed by the antenna array, the receiving beam is for receiving radio signal transmitted by another wireless communication apparatus;

performing a first processing for changing, using the plurality of antenna elements selected in the antenna array, an azimuth angle and an elevation angle for the receiving beam to determine a first angle that is a combination of the azimuth angle and the elevation angle; and performing a second processing for changing, using a number of antenna elements larger than or equal to the number of antenna elements used in the first processing, the azimuth angle and the elevation angle separately from the first angle to determine s second angle that is a final combination of the azimuth angle and the elevation angle.

(Supplementary Note 12)

A non-transitory computer readable recording medium storing a program of causing at least one processor to:

control a receiving beam formed by an antenna array including a plurality of antenna elements, the receiving beam is for receiving radio signal transmitted by another wireless communication apparatus;

perform a first processing for changing, using the plurality of antenna elements selected in the antenna array, an azimuth angle and an elevation angle for the receiving beam to determine a first angle that is a combination of the azimuth angle and the elevation angle; and perform a second processing for changing, using a number of antenna elements larger than or equal to the number of antenna elements used in the first processing, the azimuth angle and the elevation angle separately from the first angle to determine s second angle that is a final combination of the azimuth angle and the elevation angle.

(Supplementary Note 13)

A wireless communication apparatus comprising:

an antenna array including a plurality of antenna elements;

a controller for controlling a transmitting beam formed by the antenna array, the transmitting beam is for transmitting a radio signal to another wireless communication apparatus, wherein the controller:

performs a first processing for changing, using a plurality of antenna elements selected in the antenna array, an azimuth angle and an elevation angle for the transmitting beam to determine a first angle that is a combination of the azimuth angle and the elevation angle;

performs a second processing for changing, using a number of antenna elements larger than or equal to a number of antenna elements used in the first processing, the azimuth angle and the elevation angle separately from the first angle to determine a second angle that is a final combination of the azimuth angle and the elevation angle;

receive, from another wireless communication apparatus, information about a reception level for the radio signal; and performs the first processing and the second processing using the information.

(Supplementary Note 14)

A wireless communication apparatus comprising:

an antenna array including a plurality of antenna elements;

a controller for controlling a receiving beam formed by the antenna array, the receiving beam being for receiving a radio signal transmitted by another wireless communication apparatus, wherein the controller:

performs a first processing for changing, using a plurality of antenna elements selected in the antenna array, the receiving beam in a first direction to determine a first angle for the receiving beam; and performs a second processing for changing, using a number of antenna elements larger than or equal to a number of antenna elements used in the first processing, the receiving beam in the first direction from the first angle to determine a second angle that is a final angle for the receiving beam.

The arrival angle for radio signal can be estimated accurately, and the time taken for the estimation can be reduced over the simple searching method.

What is claimed is:

1. A wireless communication apparatus comprising:
   an antenna array including a plurality of antenna elements;
   a memory configured to store an instruction; and
   at least one processor configured to execute the instruction to:
   control a receiving beam formed by the antenna array, the receiving beam being for receiving a radio signal transmitted by another wireless communication apparatus;
   perform a first processing for changing, using a plurality of antenna elements selected in the antenna array, the receiving beam in a first direction to determine a first angle for the receiving beam; and
   perform a second processing for changing, using a number of antenna elements larger than or equal to a number of antenna elements used in the first processing, the receiving beam in the first direction from the first angle to determine a second angle that is a final angle for the receiving beam.

2. The wireless communication apparatus according to claim 1, wherein
   the first processing includes changing an azimuth angle and an elevation angle for the receiving beam to determine the first angle that is a combination of the azimuth angle and the elevation angle; and
   the second processing includes changing the azimuth angle and the elevation angle separately from the first angle to determine the second angle that is a final combination of the azimuth angle and the elevation angle.

3. The wireless communication apparatus according to claim 2, wherein
   the first processing includes a first searching processing and a second searching processing,
   the first searching processing includes:
   changing, using a first number of antenna elements, the azimuth angle and the elevation angle in a first search range defined by the combination of the azimuth angle and the elevation angle; and
   determining, from the first search range, a first point at which a reception level for the radio signal has a largest value,
   the second searching processing includes:
   changing, using a second number of antenna elements larger than or equal to the first number, the azimuth angle and the elevation angle in a second search range defined by the combination of the azimuth angle and the elevation angle; and
   determining, from the second search range, a second point at which the reception level for the radio signal has a largest value as the first angle,
   the second search range includes the first point and is smaller than the first search range.

4. The wireless communication apparatus according to claim 3, wherein
   the first search range includes a plurality of first search points defined by the combination of the azimuth angle and the elevation angle,
   the second search range includes a plurality of second search points defined by the combination of the azimuth angle and the elevation angle, and
   an interval between the second search points adjacent from each other is smaller than an interval between the first search points adjacent from each other.

5. The wireless communication apparatus according to claim 4, wherein
   the interval between the second search points adjacent from each other and the interval between the first search points adjacent from each other are set using a half power beam width (HPBW) for the receiving beam.

6. The wireless communication apparatus according to claim 4, wherein
   a border of the second search range is set between the first search points corresponding to the first point and the first search points adjacent to the first point.

7. The wireless communication apparatus according to claim 4, wherein
   the second search range is set to include the first search point at which a difference with the reception level for the first point is smaller than or equal to a predetermined difference level.

8. The wireless communication apparatus according to claim 7, wherein
   the at least one processor is further configured to execute the instruction to perform the first tuning processing and the second tuning processing alternately.

9. The wireless communication apparatus according to claim 3, wherein
   the at least one processor is further configured to execute the instruction to:
   perform the second searching processing using all the antenna elements included in the antenna array; and
   perform the second processing using all the antenna elements included in the antenna array.

10. The wireless communication apparatus according to claim 2, wherein
    the second processing includes a first tuning processing and a second tuning processing,
    the first tuning processing includes modifying the azimuth angle in the first angle using a first relationship, the first relationship represents a relationship between a first error corresponding to an error between an actual arrival azimuth angle for the radio signal and an estimated arrival azimuth angle for the radio signal, and a gain difference caused due to the first error, and
    the second tuning processing includes modifying the elevation angle in the first angle using a second relationship, the second relationship represents a relationship between a second error corresponding to an error between an actual arrival elevation angle for the radio signal and an estimated arrival azimuth angle for the radio signal, and a gain difference caused due to the second error.

11. The wireless communication apparatus according to claim 10, wherein
the at least one processor is further configured to execute the instruction to perform the first tuning processing and the second tuning processing repeatedly until a convergence condition for the first error and the second error is met.

12. A method performed in a wireless communication apparatus comprising an antenna array including a plurality of antenna elements, the method comprising:
controlling a receiving beam formed by the antenna array, the receiving beam is for receiving radio signal transmitted by another wireless communication apparatus;
performing a first processing for changing, using the plurality of antenna elements selected in the antenna array, the receiving beam in a first direction to determine a first angle for the receiving beam; and
performing a second processing for changing, using a number of antenna elements larger than or equal to the number of antenna elements used in the first processing, the receiving beam in the first direction from the first angle to determine a second angle that is a final angle for the receiving beam.

13. A wireless communication apparatus comprising:
an antenna array including a plurality of antenna elements;
a memory configured to store an instruction; and
at least one processor configured to execute the instruction to:
control a transmitting beam formed by the antenna array, the transmitting beam is for transmitting a radio signal to another wireless communication apparatus;
perform a first processing for changing, using a plurality of antenna elements selected in the antenna array, the transmitting beam in a first direction to determine a first angle for the transmitting beam; and
perform a second processing for changing, using a number of antenna elements larger than or equal to a number of antenna elements used in the first processing, the transmitting beam in the first direction from the first angle to determine a second angle that is a final angle for the transmitting beam;
receive, from another wireless communication apparatus, information about a reception level for the radio signal; and
performs the first processing and the second processing using the information.

\* \* \* \* \*